United States Patent
Fan et al.

(10) Patent No.: US 11,867,806 B2
(45) Date of Patent: Jan. 9, 2024

(54) SYNTHETIC APERTURE ACOUSTIC IMAGING WITH DEEP GENERATIVE MODEL

(71) Applicant: Robert Bosch GmbH, Stuttgart (DE)

(72) Inventors: Boqiang Fan, San Diego, CA (US); Samarjit Das, Wexford, PA (US)

(73) Assignee: Robert Bosch GmbH, Stuttgart (DE)

( * ) Notice: Subject to any disclaimer, the term of this patent is extended or adjusted under 35 U.S.C. 154(b) by 7 days.

(21) Appl. No.: 17/339,805

(22) Filed: Jun. 4, 2021

(65) Prior Publication Data
US 2022/0390599 A1 Dec. 8, 2022

(51) Int. Cl.
*G01S 15/89* (2006.01)
*G01S 15/00* (2020.01)
*H04R 1/08* (2006.01)
*G06N 3/08* (2023.01)

(52) U.S. Cl.
CPC ............ *G01S 15/89* (2013.01); *G01S 15/003* (2013.01); *H04R 1/08* (2013.01); *G06N 3/08* (2013.01)

(58) Field of Classification Search
CPC ......... G01S 15/89; G01S 15/003; H04R 1/08; G06N 3/08
See application file for complete search history.

(56) References Cited

U.S. PATENT DOCUMENTS

| | | | |
|---|---|---|---|
| 2014/0201630 A1* | 7/2014 | Bryan | G10L 21/0272 715/716 |
| 2017/0206464 A1 | 7/2017 | Clayton et al. | |
| 2020/0372370 A1* | 11/2020 | Donahue | G06N 3/084 |
| 2021/0068792 A1* | 3/2021 | Sornes | G01S 7/52026 |

OTHER PUBLICATIONS

Scheibler et al., "Pyroomacoustics: a python package for audio room simulation and array processing algorithms," IEEE International Conference on Acoustics, Speech and Signal Processing (ICASSP), 2017, pp. 351-355. (Year: 2017).*
Allen et al., "Image method for efficiently simulating small-room acoustics," The Journal of the Acoustical Society of America, vol 65, No. 4, Apr. 1979, pp. 943-950.
Argentieri et al., "A Survey on Sound Source Localization in Robotics: From Binaural to Array Processing Methods," Computer Speech & Language, Aug. 27, 2014, vol. 34, No. 1, 33 pages.
(Continued)

*Primary Examiner* — Isam A Alsomiri
*Assistant Examiner* — Abdallah Abulaban
(74) *Attorney, Agent, or Firm* — Brooks Kushman P.C.

(57) ABSTRACT

An acoustic imaging system includes a controller. The controller may be configured to receive a signal from a microphone and reverberation channel data, update latent variables, latent labels, a source amplitude, and a phase estimation based on an optimization of the signal and reverberation channel data to obtain updated latent variables, updated latent labels, an updated source amplitude, and an updated phase estimation, generate, via a conditional generative adversarial network (cGAN) of the updated latent variables and the updated latent labels, an acoustic source map tuned via the updated source amplitude and the updated phase estimation, optimize the acoustic source map, and output the optimized acoustic source map.

20 Claims, 13 Drawing Sheets

(56) References Cited

OTHER PUBLICATIONS

Arora et al., "Do GANS actually learn the distribution? An empirical study," Jul. 4, 2017, pp. 1-11 arXiv:1706.08224v2.
Bora et al., "Compressed Sensing using Generative Models," Proceedings of the 34th International Conference on Machine Learning, vol. 70, 2017, pp. 1-24, arXiv:1703.03208v1.
Brandwood "A complex gradient operator and its application in adaptive array theory," IEE Proceedings H Microwaves, Optics and Antennas, vol. 130, No. 1, Feb. 1983, pp. 11-16.
Chiariotti et al., "Acoustic beamforming for noise source localization—Reviews, methodology and applications," Mechanical Systems and Signal Processing, vol. 120, 2019, pp. 422-448, https://doi.org/10.1016/j.ymssp.2018.09.019.
Denton et al., "Deep Generative Image Models using a Laplacian Pyramid of Adversarial Networks," Advances in Neural Information Processing Systems, 2015, pp. 1-10, arXiv:1506.05751v1.
Garnier et al., "Passive Synthetic Aperture Imaging," SIAM Journal on Imaging Sciences, vol. 8, No. 4, 2015, pp. 2683-2705, DOI: 10.1137/15M1019696.
Kingman et al., "Adam: A Method for Stochastic Optimization," 3rd International Conference on Learning Representations (ICLR), 2015, pp. 1-15, arXiv: 1412.6980v9.
Lei, "Localization of low-frequency coherent sound sources with compressive beamforming-based passive synthetic aperture," The Journal of the Acoustical Society of America, vol. 137, No. 4, Apr. 2015, pp. EL255-EL260, DOI: 10.1121/1.4915003.
Le Roux et al., "Source localization in reverberant environments using sparse optimization," 2013 IEEE International Conference on Acoustics, Speech and Signal Processing (ICASSP), 2013, pp. 4310-4314.
Meyer et al., "Noise source localization within a car interior using 3d-microphone arrays," Proceedings of the 1st Berlin Beamforming Conference (BeBeC), 2006, pp. 1-7.
Mosser et al., "Stochastic Seismic Waveform Inversion using Generative Adversarial Networks as a Geological Prior," Mathematical Geosciences, vol. 52, No. 1, Jun. 10, 2018, 16 pages, arXiv:1806.03720v1.
Norton et al., "Passive imaging of underground acoustic sources," The Journal of the Acoustical Society of America, vol. 119, No. 5, May 2006, pp. 2840-2847, DOI: 10.1121/1.2188667.
Padois et al., "Orthogonal matching pursuit applied to the deconvolution approach for the mapping of acoustic sources inverse problem," The Journal of the Acoustical Society of America, vol. 138, No. 6, Dec. 2015, pp. 3678-3685, http://doi.org/10.1121/1.4937609.
Siegwart et al., "Introduction to Autonomous Mobile Robots," MIT press, 2011, 336 pages.
Fan, Boqiang, and Samarjit Das. "Synthetic aperture acoustic imaging with deep generative model based source distribution prior." ICASSP 2021-2021 IEEE International Conference on Acoustics, Speech and Signal Processing (ICASSP). IEEE, 2021.

\* cited by examiner

SYNTHETIC APERTURE ACOUSTIC IMAGING WITH DEEP GENERATIVE MODEL

CROSS-REFERENCE TO RELATED APPLICATIONS

Technical Field

This disclosure relates generally to a system and method of sensing using sound. More specifically, this application relates to improvements in imaging using sound via a generative adversarial network (GAN) of a generator network and a discriminator network to produce a synthetic apertured acoustic image.

BACKGROUND

Acoustic imaging uses sound to detect and describe objects, features, or operational states of or within objects that are located in a fluid. The fluid may be a liquid, like water, oil, waste water, or the fluid may be a gas like air. Acoustic imaging may passively listen to an environment and construct an acoustic image, or actively emit a ping and listen for reflected and scattered sound to return to create the acoustic image. For example, sonar (sound ranging) is used to explore the bodies of water by emitting sound out into the water and listening for reflected and scattered sound to return. Sonars is frequently used to detect the seafloor, sunken object, find fish, and identify areas of the ocean with unusual density variations or turbulence.

SUMMARY

An acoustic imaging system includes a controller. The controller may be configured to receive a signal from a microphone and reverberation channel data, update latent variables, latent labels, a source amplitude, and a phase estimation based on an optimization of the signal and reverberation channel data to obtain updated latent variables, updated latent labels, an updated source amplitude, and an updated phase estimation, generate, via a conditional generative adversarial network (cGAN) of the updated latent variables and the updated latent labels, an acoustic source map tuned via the updated source amplitude and the updated phase estimation, optimize the acoustic source map, and output the optimized acoustic source map.

A method of acoustic imaging an area includes training a conditional generative adversarial network (cGAN) based on spatial-temporal data of an area to obtain a trained cGAN, receiving a signal from a microphone and reverberation channel data from within the area, generating, via the trained cGAN, an acoustic image, updating the trained cGAN based on an optimization of the signal and reverberation channel data to obtain an updated, trained cGAN, generating, via the updated trained cGAN, an acoustic source map, optimizing the acoustic source map to obtain an optimized acoustic source map, and outputting the optimized acoustic source map.

A wave energy imaging system includes a controller. The controller may be configured to, receive a signal from a wave energy sensor and reverberation channel data, generate latent variables, latent labels, source amplitude, and a phase estimation, update the latent variables, latent labels, source amplitude, and a phase estimation based on an optimization of the signal and reverberation channel data, generate, via a cGAN of the updated latent variables and the updated latent labels, a wave energy source map that is tuned via the source amplitude and phase estimation, optimize the wave energy source map to obtain an optimized wave energy source map, and output the optimized wave energy source map.

DETAILED DESCRIPTION

Figure 1:
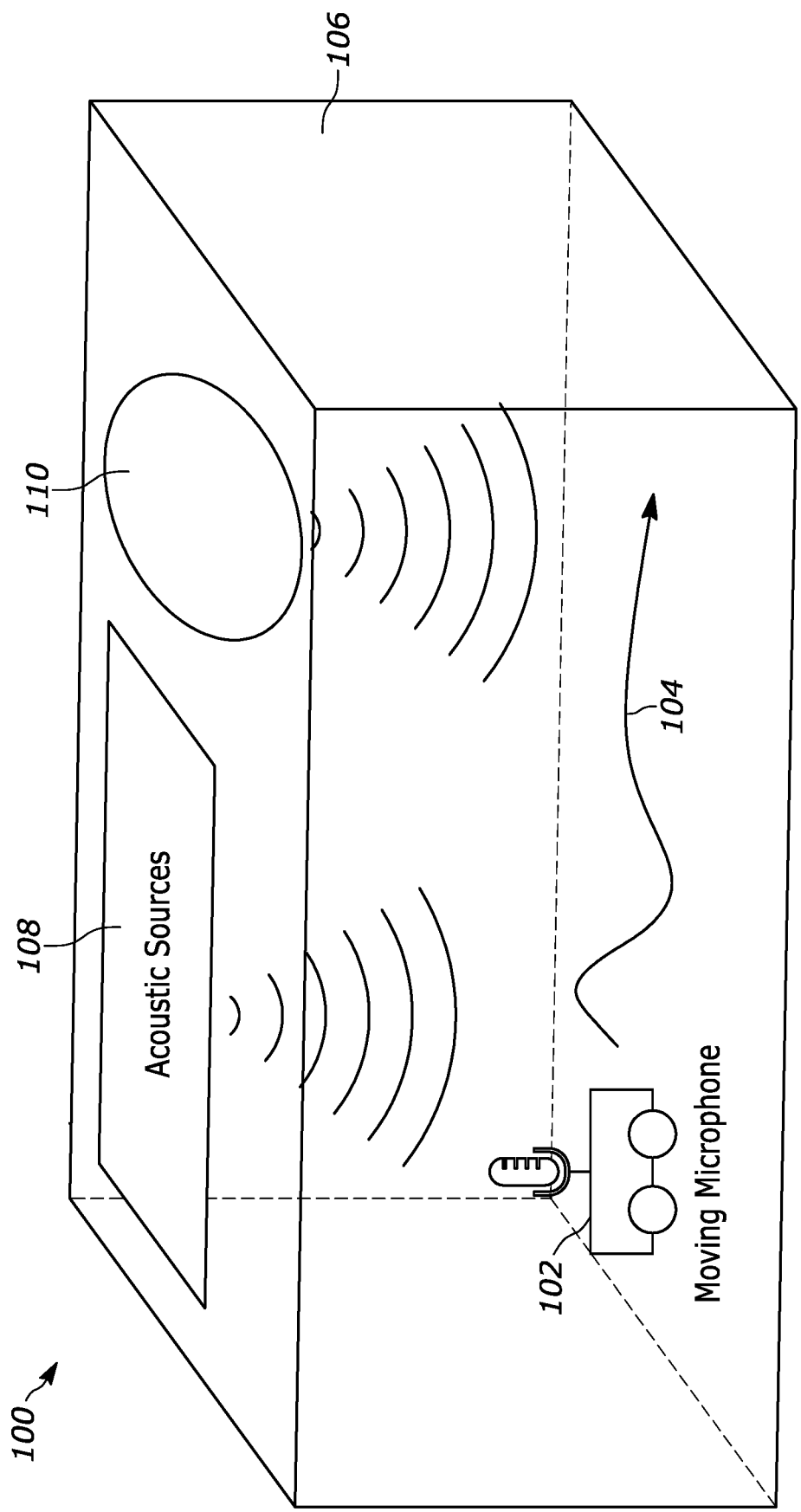
FIG. 1 is an illustration of a room acoustic imaging system via a movable microphone.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The term "substantially" may be used herein to describe disclosed or claimed embodiments. The term "substantially" may modify a value or relative characteristic disclosed or claimed in the present disclosure. In such instances, "substantially" may signify that the value or relative characteristic it modifies is within±0%, 0.1%, 0.5%, 1%, 2%, 3%, 4%, 5% or 10% of the value or relative characteristic.

The term sensor refers to a device which detects or measures a physical property and records, indicates, or otherwise responds to it. The term sensor include an optical, light, imaging, or photon sensor (e.g., a charge-coupled device (CCD), a CMOS active-pixel sensor (APS), infrared sensor (IR), CMOS sensor), an acoustic, sound, or vibration sensor (e.g., microphone, geophone, hydrophone), an automotive sensor (e.g., wheel speed, parking, radar, oxygen, blind spot, torque), a chemical sensor (e.g., ion-sensitive field effect transistor (ISFET), oxygen, carbon dioxide, chemiresistor, holographic sensor), an electric current, electric potential, magnetic, or radio frequency sensor (e.g., Hall effect, magnetometer, magnetoresistance, Faraday cup, Galvanometer), an environment, weather, moisture, or humidity sensor (e.g., weather radar, actinometer), a flow, or fluid velocity sensor (e.g., mass air flow sensor, anemometer), an ionizing radiation, or subatomic particles sensor (e.g., ionization chamber, Geiger counter, neutron detector), a navigation sensor (e.g., a global positioning system (GPS) sensor, magneto hydrodynamic (MHD) sensor), a position, angle, displacement, distance, speed, or acceleration sensor (e.g., LIDAR, accelerometer, Ultra-wideband radar, piezoelectric sensor), a force, density, or level sensor (e.g., strain gauge, nuclear density gauge), a thermal, heat, or temperature sensor (e.g., Infrared thermometer, pyrometer, thermocouple, thermistor, microwave radiometer), or other device, module, machine, or subsystem whose purpose is to detect or measure a physical property and record, indicate, or otherwise respond to it.

Specifically, a sensor may measure properties of a wave/energy value of a wave at a given time and location in space. The wave may include electromechanical, sound, light, electromagnetic, RF. This technology can be applied to imaging with other sensors, e.g., antenna for wireless electromagnetic waves.

The term image refers to a representation or artifact that depicts perception of a physical characteristic (e.g., audible sound, visible light, Infrared light, ultrasound, underwater acoustics), such as a photograph or other two-dimensional picture, that resembles a subject (e.g., a physical object, scene, or property) and thus provides a depiction of it. An image may be multi-dimensional in that in may include components of time, space, intensity, concentration, or other characteristic. For example, an image may include a time series image. This technology can also be extended to image 3-D acoustic sources or objects.

Acoustic imaging has a wide range of real-world applications such as machine health monitoring. Conventionally, large microphone arrays are utilized to achieve useful spatial resolution in the imaging process. The advent of location-aware autonomous mobile robotic platforms opens up unique opportunity to apply synthetic aperture techniques to the acoustic imaging problem. By leveraging motion and location cues as well as some available prior information on the source distribution, a small moving microphone array has the potential to achieve imaging resolution far beyond the physical aperture limits. In this disclosure, we present solutions to image large acoustic sources with a combination of synthetic aperture and their geometric structures modeled by a conditional generative adversarial network (cGAN). The acoustic imaging problem is formulated as a linear inverse problem and solved with the gradient-based method. Numerical simulations show that this synthetic aperture imaging framework can reconstruct the acoustic source distribution from microphone recordings and outperform static microphone arrays.

Acoustic imaging has been widely applied in many real-world scenarios, as a technique that uses sound signals recorded by microphone arrays to reconstruct the source map. Specifically, room acoustic imaging is of great significance in applications including machine and infrastructure health monitoring, automotive diagnostics, acoustic scene understanding to name a few. Traditional acoustic cameras are usually composed of numerous microphones and locate acoustic sources via beamforming. Due to the large wavelength of audible sources in an indoor environment, such cameras are usually very large and expensive, leading to inconvenience in broader applications. The development of location-aware autonomous mobile robotic platforms opens up the possibility of acoustic imaging even with a low-cost small microphone array with few elements. A synthetic aperture technique aggregates the sound signals sequentially recorded with microphones mounted on a mobile platform, and leverages the moving trajectory to form a virtual array for imaging. A well-designed trajectory creates a synthetic aperture much larger than a real microphone array regardless of the device constraints. This has the potential to further improve the acoustic imaging resolution at a relatively low cost.

To solve acoustic imaging problems, traditional beamforming algorithms form beams to scan over the imaging region and locate each source separately. The scanning beams are usually formed based on free-field propagation channels and may not be able to leverage the channel information integrating reverberations. On the other hand, with the reverberation knowledge available in many scenarios, an acoustic imaging problem can be solved as a linear inverse problem. Such inverse problems are usually underdetermined when a high imaging resolution is required, since the recording samples are usually limited compared to imaging pixels even with a synthetic aperture. Therefore, prior knowledge about the source distribution is often necessary to make the ground truth estimation problem tractable or less ill-posed. It has been assumed that acoustic sources are spatially sparsely distributed, implying that only point sources are considered, and used compressed sensing method to locate the sources. However, in many cases, the size and the shape of acoustic sources are not supposed to be ignored. Such sources are hard to be modeled as separate points and sparsely represented in a domain defined by linear basis.

A new method that defines the structure of solutions to inverse problems has been proposed, which utilizes pre-trained generative models to represent the possible distribution of solutions. One method is to train a generative adversarial network (GAN) to model the geological heterogeneity in seismic waveform inversion. Due to the diversity of acoustic sources, a challenge to integrate this method to room acoustic imaging problem is to find a way to represent all potential types of sources in an indoor environment. Instead of training a single model directly for all types of sources, in this disclosure it is proposed to model large acoustic sources as a combination of simple geometric shape components. As a result, only a simple model needs to be trained to represent basic shape components, and the general imaging problem can then be solved for acoustic sources with any arbitrary structures.

In this disclosure, a new framework is built for solving the synthetic aperture acoustic imaging problem with source structures approximated by a combination of basic geometric shape components. A conditional GAN (cGAN) architecture is trained to model two types of basic shapes, i.e., ellipses and rectangles, however the techniques are not limited to those shapes but include many shapes (e.g., triangles, circles, squares, parallelograms, star, trapezoid, rhombus, pentagon, hexagon, heptagon, octagon, etc.) and the regularized acoustic imaging problem is formulated and solved with the Adaptive Moment Estimation (Adam) method. Numerical results illustrate that this synthetic aperture framework can successfully reconstruct the acoustic source map from moving microphone recordings and outperform imaging with static arrays.

This disclosure presents a system to image acoustic sources in a room using the synthetic aperture method, as is shown in FIG. 1. FIG. 1 is an illustration of a room acoustic imaging system 100 via a movable microphone. The movable microphone 102 travels along a path 104 in an area 106 that has a first acoustic source 108 and a second acoustic source 110. Although this can be applied more generally, assume that the room 106 is a box, and the acoustic sources 108, 110 are all on the same imaging plane. The following analysis can be easily generalized to cases in which acoustic sources are arbitrarily distributed. The map and the acoustic property of the room 106 is assumed to be known, while the distribution of acoustic sources 108, 110 are unavailable. This system discretizes the imaging plane into N pixels, and each pixel n is assumed to be a potential acoustic source with signal $s_n(t)$. Then model $s_n(t)$ as a continuous sine wave with constant frequency $f_0$ and amplitude $A_n$. This can be expressed by equation 1 below, $$s_n(t) = A_n \sin(2\pi f_0 t) \quad (1)$$

Equation 1 can be applied to model the sound waves generated by machines or infrastructures. Note that $A_n$ can be 0, implying that there is no real acoustic source at pixel n.

A microphone array 102 moves inside the room 106 and records the acoustic signals at different locations along the path 104 to form a synthetic aperture. Then assume that the microphone array consists of $M_0$ elements. The moving array 102 stops and records the sound at $M_R$ locations along path 104 for a fixed duration T each. Without losing generality, the first recording starts at time t=0, and the moving time between adjacent recording locations is assumed to be insignificant. Then the total number of positions for microphone recording is defined as M, which can be viewed as the number of elements on the synthetic microphone array. Usually, $M = M_0 M_R$. Then define $p_{mn}(t)$ as the recorded signal from the imaging pixel n at each microphone m of the synthetic aperture, that can be expressed as equation 2, $$p_{mn}(t) = w_T(t)[s_n(t+T_m) * h_{mn}(t)] \quad (2)$$

Here $w_T(t)$ is the window function indicating the recording period, which is defined as $w_T(t)=1$ for $0 \leq t \leq T$; otherwise $w_T(t)=0$. The time delay $T_m$ represents the delay in recordings at microphone m introduced by the moving aperture. The acoustic propagation channel is characterized by the room impulse response $h_{mn}(t)$ from the imaging pixel n to the microphone m. In this disclosure assume that $h_{mn}(t)$ is subject to a model, and can be computed for imaging with the room map and the room acoustic property. Here, * is used to denote the convolution operator. To recover $s_n(t)$, transform equation (2) into the domain of angular frequency ω that can be represented as, $$P_{mn}(\omega) = W_T(\omega) * [e^{j\omega T_m} S_n(\omega) H_{mn}(\omega)] \quad (3)$$

Here $P_{mn}(\omega)$ represents the Fourier transform of $p_{mn}(t)$, $S_n(\omega)$ represents the Fourier transform of $s_n(t)$, and $H_{mn}(\omega)$ represents the transfer function between the source pixel n and the microphone location m. The window function has Fourier transform $W_T(\omega)$. Since in this disclosure it is assumed source signals as pure tones at a frequency $f_0$ in equation (1), then at the angular frequency of interest $\omega_0 = 2\pi f_0$, The frequency-domain signal can be expressed by equation 4, $$P_{mn}(\omega_0) = -j\pi A_n [e^{j\omega_0 T_m} H_{mn}(\omega_0) W_T(0) - e^{-j\omega_0 T_m} H_{mn}(-\omega_0) W_T(2\omega_0)] \approx -j\pi A_n T e^{j\omega_0 T_m} H_{mn}(\omega_0) \quad (4)$$

The above approximation implies that the negative frequency component is insignificant, which is valid if the recording duration $$T \gg \frac{1}{f_0}$$

for all acoustic sources, since $W_T(\omega)$ is a phase-shifted Sinc function. This disclosure assumes propagation is in a linear medium. Therefore, in the frequency domain, the sum signal from all sources recorded by microphone m can be represented by $R_m(\omega_0) = \sum_{n=1}^{N} P_{mn}(\omega_0)$ at frequency $\omega_0$. To recover the source signals from recordings based on equation (4), only the amplitude $A_n$ in this model is unknown. Hence formulation to the reconstruction problem is by summarizing equation (4) for each pair of m and n in matrix form as a linear inverse problem. Specifically, define the recording vector $R(\omega_0) = [R_1(\omega_0), \ldots, R_M(\omega_0)]^T$ R and the source signal vector $S(\omega_0)$ proportional to $[A_1, \ldots, A_N]^T$, where $[\cdot]^T$ denotes the transpose operator. The channel matrix is defined as $H(\omega_0)$, whose element on the mth row and nth column is proportional to $e^{j\omega_0 T_m} H_{mn}(\omega_0)$. The channel matrix $H(\omega_0)$ can be constructed from measurement data if available in real applications. Then the propagation at the frequency of interest $\omega_0$ can be approximately characterized by equation 5 shown below $$R(\omega_0) = H(\omega_0) = H(\omega_0) S(\omega_0) \quad (5)$$

The goal is to recover $S(\omega_0)$ from $R(\omega_0)$ and $H(\omega_0)$. For high resolution imaging, assume that the number of imaging pixels N>>M. It is straightforward to generalize the formulation above to include multiple narrow-band signals. From the spectrum of each recorded signal $R_m(\omega)$, each frequency of interest can be found and equation (5) can be solved separately.

One can assume that the acoustic sources can be modeled as separate points. However, many real-world acoustic resources, like the air conditioner and the industrial machines, occupies a large space and is not suitable to be modeled as point sources. To address this problem, in this disclosure it is assumed that $S(\omega_0)$ contains sources that have specific shapes and occupy large continuous areas on the imaging plane. The method used to reconstruct such acoustic sources will be discussed in details in the next section.

Reconstructing $S(\omega_0)$ according to equation (5) is an underdetermined linear inverse problem, which introduces challenges to approximate the unique ground truth solution. Therefore, prior information about the source distribution, $S(\omega_0)$, is necessary to solve the problem. Since many acoustic sources in real-world scenarios take large continuous areas on the imaging plane, in this disclosure, these sources can be approximated by a linear combination of geometric shape components. The conditional generator G(z,l) in a cGAN model that is trained to represent either elliptical components with l=1 or rectangular components with l=0. The method can be generalized to include more other geometric shape components or components of real-world acoustic sources. Then the acoustic source map $S(\omega_0)$ can be approximated by equation 6 below $$S(\omega_0) \approx \hat{S}_{\omega_0}(B_k^{(l)}, z_k^{(l)}) = \Sigma_{l=0}^{1} \Sigma_{k=1}^{K} B_k^{(l)} G(z_k^{(l)}, l) \quad (6)$$

in which K denotes the number of geometric shape components needed to represent all sources. Note that the components can overlap with each other. The relative amplitude for each shape component k is defined as $B_k^{(l)}$, implying that all pixels in the same shape component have the same amplitude. The vector $z_k^{(l)}$ denotes the latent input for the generator to produce the shape component k of type l. The output of $G(z_k^{(l)}, l)$ is reshaped as a vector to match the dimension of $S(\omega_0)$. To reconstruct the acoustic image from recordings satisfying equation (5), consider minimizing the regularized objective function as following by optimizing $B_k^{(l)}$ and $z_k^{(l)}$, that can be expressed as equation 7 below.

$$\|H(\omega_0)\hat{S}_{107_0}(B_k^{(l)}, z_k^{(l)}) - R(\omega_0)\|_2^2 + \lambda \Sigma_{l=0}^{1} \Sigma_{k=1}^{K} \|z_k^{(l)}\|_2^2 \quad (7)$$

The first norm term denotes the error of acoustic recordings given an approximated source map generated from equation (6). The second term serves as a regularization that encourages searches in the latent space. With the function in equation (7) defined as $F_{\omega_0}$, the gradient of $F_{\omega_0}$ with respect to each real vector $z_k^{(l)}$ can be expressed as $$\nabla_{z_k^{(l)}} F_{\omega_0} = 2 \mathcal{R}\{J^T[B_k^{(l)}]^H[H]^H(H\hat{S}_{\omega_0} - R)\} + 2\lambda z_k^{(l)} \quad (8)$$

in which $J(z_k^{(l)}, l)$ denotes the Jacobian matrix for the generator function $G(z_k^{(l)}, l)$ that can be numerically calculated. The operator $\mathcal{R}\{\cdot\}$ calculates the real part of each vector element, and the operator $[\cdot]^H$ calculates the conjugate transpose. For the amplitude variable, we do not enforce $B_k^{(l)}$ to be a real number, which allows different shape sources to have different phases. To solve the optimization problem in equation (7) all variables are first mapped to the real domain, and in this case, the derivative of $F_{\omega_0}$ with respect to each $B_k^{(l)}$ is equivalent to equation 9 below $$\frac{\partial F_{\omega_0}}{\partial B_k^{(l)}} = 2[G(z_k^{(l)}, l)]^T[H]^H(H\hat{S}_{\omega_0} - R) \quad (9)$$

Based on the gradients and derivatives derived, the Adam optimizer is adopted to solve the problem by updating the variables iteratively. The process stops after a certain number of iterations or when the step size is below a threshold. This illustrative example was iteratively solve with at most 250 iterations, with step size threshold of 1e-4. The threshold, as well as the number of iterations, can be adapted according to the application/environment/data.

To search in a larger latent space and avoid stuck into the local minima, researchers have proposed to use multiple random initializations of the latent vector $z_k^{(l)}$. However, GAN models sometimes cannot perfectly learn the target distribution, which can lead to unbalanced representation of the whole shape component set even with uniformly picked $z_k^{(l)}$. To improve the representation of components generated, this disclosure aims to enforce the initialized shape components to be approximately uniformly picked from the whole shape set. To be more specific, for each initialization, first randomly generate 2K bounding boxes for shape components, whose sizes and locations are uniformly drawn. Then for each bounding box, randomly pick $z_k^{(l)}$ until the error between $G(z_k^{(l)}, l)$ and the bounding box is below a threshold. This illustrative example required that $G(z_k^{(l)}, l)$ not exceed the bounding box for 4 pixels (equivalent to 0.4 m) in each direction. This threshold should be adapted according to the application/resolution requirement/environment/data In this way, the initializations are more evenly picked from the geometric shape set, and can intuitively help to find the global optimal solution. The amplitude $B_k^{(l)}$ is initialized to be very close to 0. We conduct the optimization with X initializations in total, and finally pick the set of $z_k^{(l)}$ and $B_k^{(l)}$ that leads to the minimal acoustic recording error.

Figure 2:
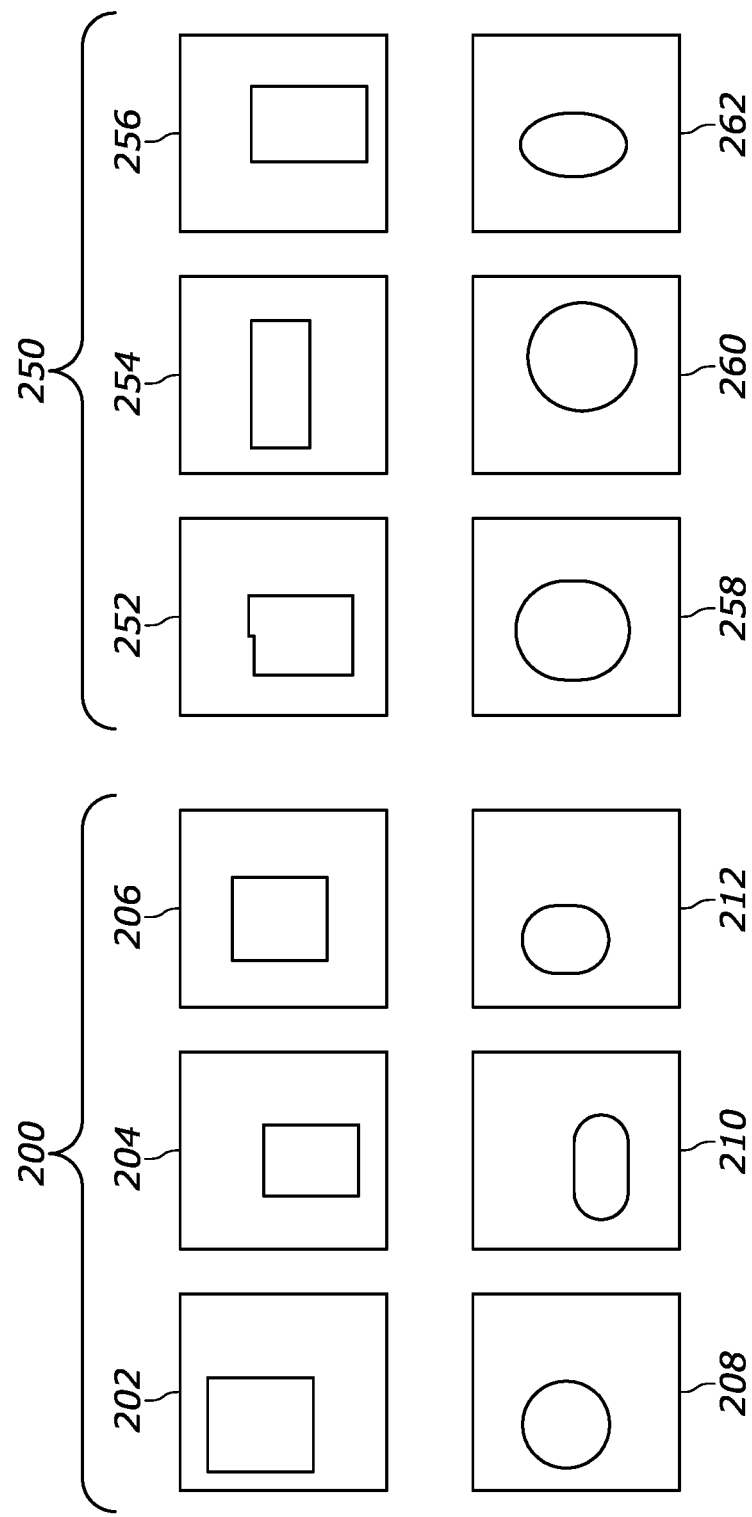
FIG. 2 are graphical representations of geometric shape components and corresponding geometric shape components generated by a trained cGAN.

The performance of this framework was evaluated through numerical simulations. The dimension of the room for acoustic imaging is set to 4×4×4 m³. The acoustic sources are located on an imaging plane close to one side of the room, and the imaging plane is divided into N=40×40 pixels. A cGAN is first trained to model basic geometric shapes on images with the same size. The discriminator takes the image and the shape label l, which is integrated after encoding, as the input. Before reaching the output layer, the integrated input goes through two convolutional layers with 256 4×4 filters each layer and the dimension scaled down to 10×10. The generator has a latent input of dimension 32, which is linearly encoded as 10×10 images. Then the images with labels integrated goes through two transposed convolutional layers and scales up as 40×40 outputs, matching the size of the imaging plane. The output images generally have binary pixel values. For each type of shape components, 2000 samples are randomly generated as the training data. The learning rates for the discriminator and the generator are $10^{-5}$ and $10^{-4}$ respectively. The performance of the trained cGAN is evaluated in FIG. 2. FIG. 2 are graphical representations 200 of geometric shape components and corresponding geometric shape components generated by a trained cGAN. This representation is broken up into geometric shape components 200 and corresponding geometric shape components 250 generated by a trained cGAN. A first 202, second 204, and third 206 rectangular geometric shape component and a corresponding first 252, second 254, and third 256 rectangular geometric shape component generated by a trained cGAN. Likewise, A first 208, second 210, and third 212 oval geometric shape component and a corresponding first 258, second 260, and third 262 oval geometric shape component generated by a trained cGAN. Figures on the left show random geometric shape components used for training, while figures on the right show geometric shape components randomly generated by the trained generator. The first row presents rectangular components and the second row presents elliptical components. Generally the generated data capture most shape features in the training images with small distortions. Meanwhile, note that the sizes of ellipses generated do not completely match the training data, implying that the generator cannot perfectly learn the distribution of the training data.

The trained generator above is used to reconstruct acoustic sources from simulated sound recordings. The Pyroomacoustics package is used for simulating the acoustic wave propagation in the room. The sound speed in the room is set to 343 m/s, and the absorption of the wall is set to 0.1. It is assumed that all acoustic sources operate at the same frequency $f_0$=1600 Hz, and the sampling frequency of the microphone is set to 44.1 kHz. Compare the performance of this synthetic aperture acoustic imaging framework to a benchmark setup with a static microphone array. The static array consists of $M_0$=8 microphones, and is approximately located on the central axis of the imaging plane. In contrast, the synthetic aperture setup assumes only $M_0$=1 moving microphone. The microphone is assumed to approximately move along a straight line parallel to the imaging plane, and the total number of recording locations is assumed to be $M_R=39$. The axial distance from the microphones to the imaging plane in both setups is set to about 2.9 m, and the recording duration T=0.1 s. To solve the acoustic imaging problem (7), use X=100 initializations each for at most 250 iterations. The learning rate for the Adam optimizer is set to $2\times10^{-2}$, and the regularization coefficient is set to $\lambda=50$. The same imaging algorithm and parameters as above are applied to both microphone setups.

Figure 3:
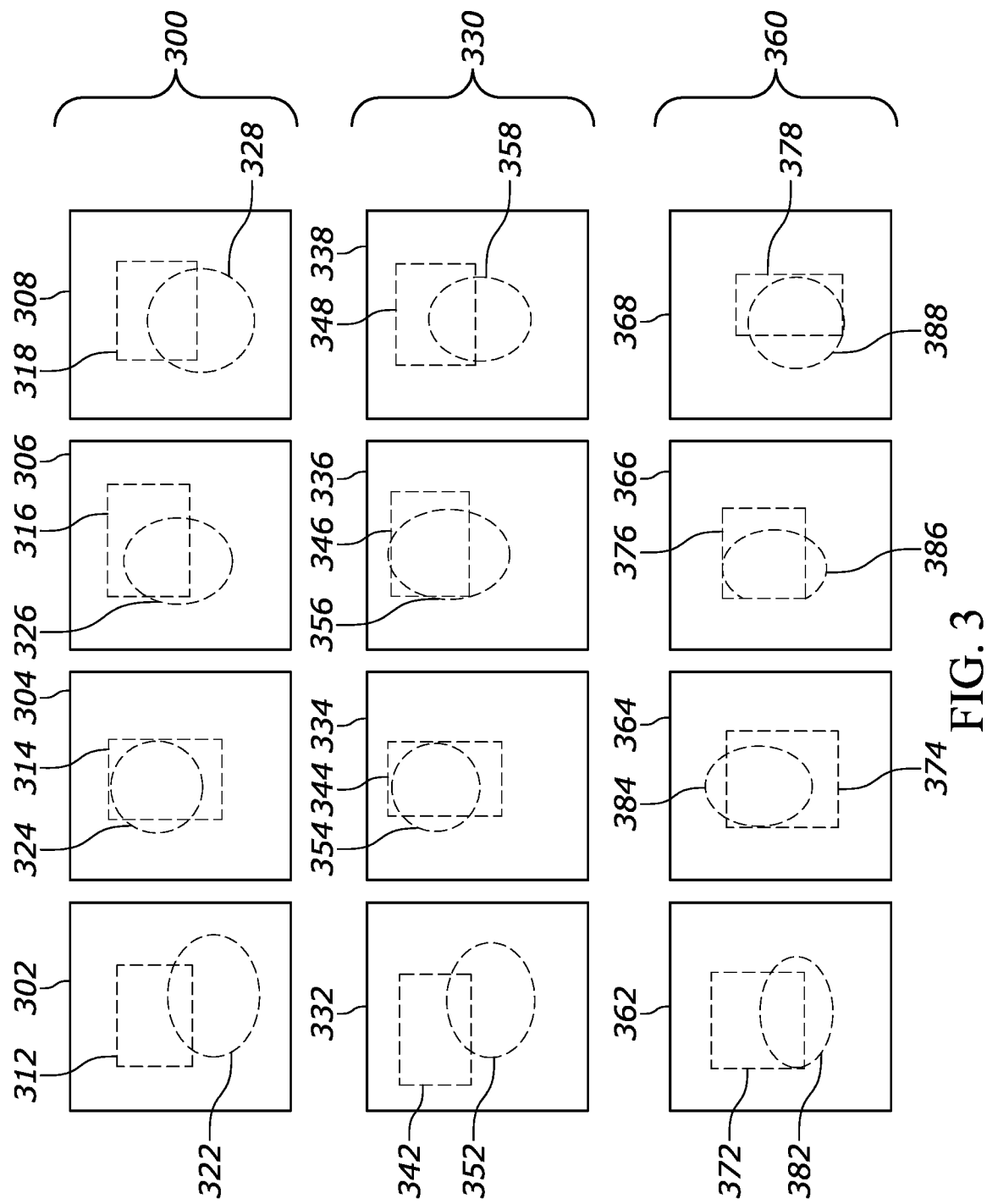
FIG. 3 is a graphical representation of selected ground truth source maps, the acoustic imaging results with the synthetic aperture, and the static microphone array in which each column is associated with an image.

FIG. 3 is a graphical representation of selected ground truth source maps 300, the acoustic imaging results with the synthetic aperture 330 and the static microphone array 360 in which each column is associated with an image. In image 302, there are two acoustic sources a rectangular acoustic source 312 and an oval acoustic source 322 that illustrate the ground truth location of these sources. By using the synthetic aperture method, the locations of acoustic sources can be reconstructed as in image 332, in which 342 is the rectangular source and 352 is the oval source. By using a static microphone array, the locations of acoustic sources can be reconstructed as in image 362, in which 372 is the rectangular source and 382 is the oval source. In image 304, there are two acoustic sources a rectangular acoustic source 314 and an oval acoustic source 324 that illustrate the ground truth location of these sources. By using the synthetic aperture method, the locations of acoustic sources can be reconstructed as in image 334, in which 344 is the rectangular source and 354 is the oval source. By using a static microphone array, the locations of acoustic sources can be reconstructed as in image 364, in which 374 is the rectangular source and 384 is the oval source. In image 306, there are two acoustic sources a rectangular acoustic source 316 and an oval acoustic source 322 that illustrate the ground truth location of these sources. By using the synthetic aperture method, the locations of acoustic sources can be reconstructed as in image 336, in which 346 is the rectangular source and 356 is the oval source. By using a static microphone array, the locations of acoustic sources can be reconstructed as in image 366, in which 376 is the rectangular source and 386 is the oval source. In image 308, there are two acoustic sources a rectangular acoustic source 318 and an oval acoustic source 328 that illustrate the ground truth location of these sources. By using the synthetic aperture method, the locations of acoustic sources can be reconstructed as in image 338, in which 348 is the rectangular source and 358 is the oval source. By using a static microphone array, the locations of acoustic sources can be reconstructed as in image 368, in which 378 is the rectangular source and 388 is the oval source.

FIG. 3 is a comparison between the reconstructed acoustic images of both setups with different selected ground truth images. The ground truth source maps, which take the absolute value of each element in $S(\omega_0)$, are shown in the first row and are randomly generated based on equation (6). The reconstructed images from the synthetic aperture, which take the absolute value of each element in $\hat{S}_{\omega_0}(B_k^{(I)}, z_k^{(I)})$, is shown in the second row, while the images from the static microphone array is listed in the third row. Note that all images have been normalized with the maximal pixel value being 1 to show the shape reconstruction accuracy more clearly. It is shown that when the real acoustic sources can be modeled by the generator, this framework can generally reconstruct the source map from microphone recordings. The mean 2-norm reconstruction error of images in FIG. 3 with the synthetic aperture is about 4.70, while the mean error of the static array reconstruction is about 7.98. Compared to the static microphone array, the synthetic aperture technique usually leads to higher reconstruction accuracy, since the trajectory based aperture can go beyond the size constraints of the microphone array and allows for higher imaging resolution. Note that although not shown here, there is possibility for unsuccessful reconstruction within limited initializations, due to the strong dependence of results on the randomly initialized source structures.

Figure 4:
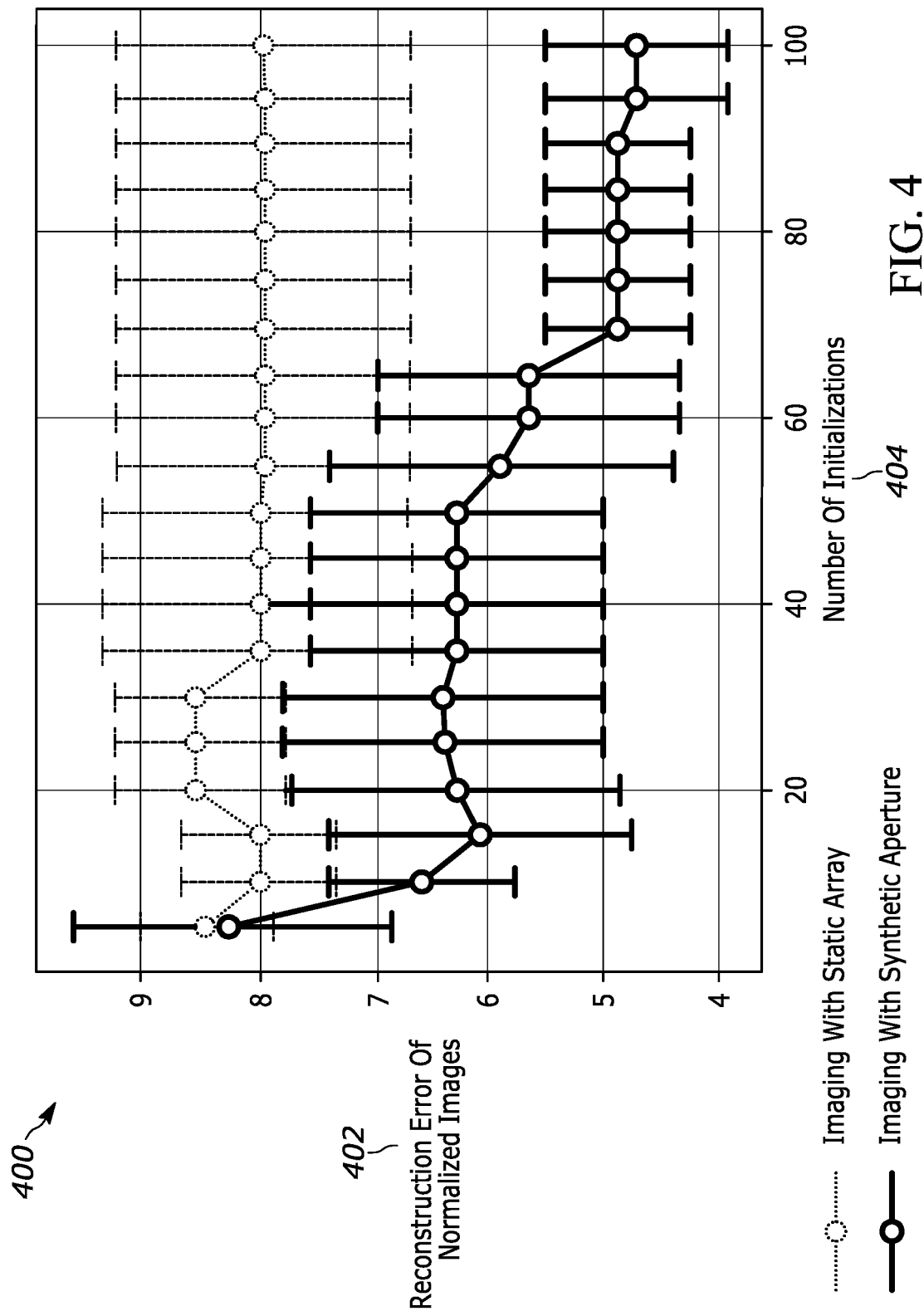
FIG. 4 is a graphical representation of reconstruction error of normalized images with respect to number of initializations.

FIG. 4 is a graphical representation 400 of reconstruction error of normalized images 402 with respect to number of initializations 404. The average source map reconstruction errors using the synthetic aperture (solid line) and the static microphone array (dashed line) are plotted with error bars representing standard deviations. In FIG. 4, we aim to evaluate how the number of initializations X affects the average acoustic image reconstruction accuracy. With the same ground truth source maps in FIG. 3, we still use 100 initializations in total. However, the reconstruction error from the first X initializations are evaluated and plotted. The solid curve represents our synthetic aperture imaging approach, while the dashed curve represents the imaging result of the static array. The error bars denote the standard deviations of the reconstruction errors. The reconstruction error of our synthetic aperture approach is much lower than the static array, which is consistent with the illustration in FIG. 3. In addition, the error with the static array does not change significantly after around 40 initializations, while for the synthetic aperture approach the error can almost continuously decrease. Such a phenomenon reveals the relationship between the number of recording samples M and the convergence. Generally with more recording samples, the reconstruction error converges slower but to a smaller value. Therefore, to apply this acoustic imaging framework to real-world applications, the number of initializations X needs to be carefully selected based on the recording samples considering the tradeoff between the computational time and the imaging performance.

This disclosure presented a framework for solving the synthetic aperture acoustic imaging problem by using cGAN-based geometric shape components to approximate the actual source distribution. Numerical simulations illustrated that the acoustic imaging framework can successfully reconstruct the source map from the recordings of moving microphones, and the synthetic aperture technique can provide better reconstruction accuracy than the static array in room acoustic imaging. These techniques can be applied to a synthetic aperture acoustic imaging approach for reconstructing complicated sound sources with much more geometric shape components. Such shape components may also come from real data and from imperfect room channel information.

Figure 5:
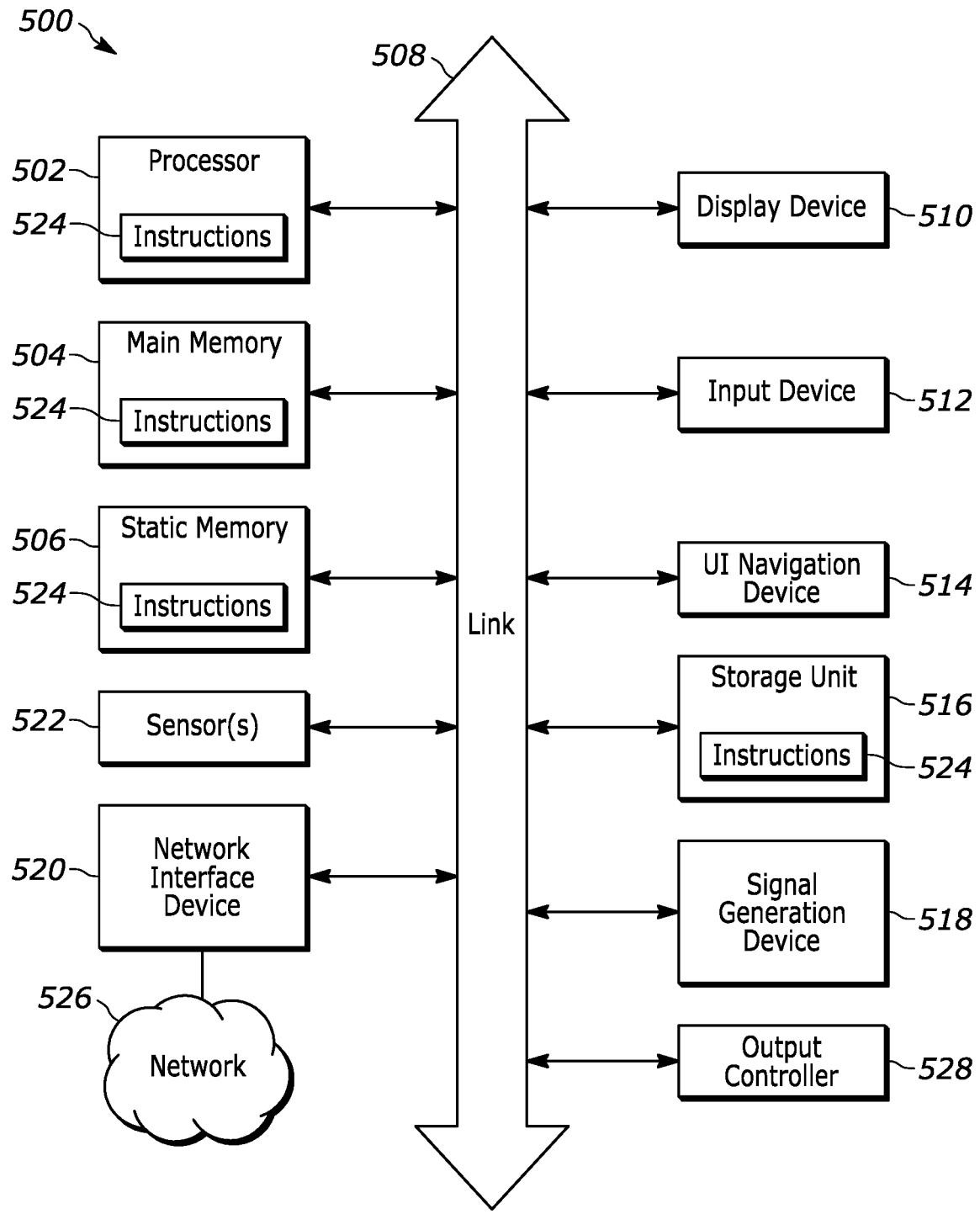
FIG. 5 is a block diagram of an electronic computing system.

Example Machine Architecture and Machine-Readable Medium. FIG. 5 is a block diagram of an electronic computing system suitable for implementing the systems or for executing the methods disclosed herein. The machine of FIG. 5 is shown as a standalone device, which is suitable for implementation of the concepts above. For the server aspects described above a plurality of such machines operating in a data center, part of a cloud architecture, and so forth can be used. In server aspects, not all of the illustrated functions and devices are utilized. For example, while a system, device, etc. that a user uses to interact with a server and/or the cloud architectures may have a screen, a touch screen input, etc., servers often do not have screens, touch screens, cameras and so forth and typically interact with users through connected systems that have appropriate input and output aspects. Therefore, the architecture below should be taken as encompassing multiple types of devices and machines and various aspects may or may not exist in any particular device or machine depending on its form factor and purpose (for example, servers rarely have cameras, while wearables rarely comprise magnetic disks). However, the example explanation of FIG. 5 is suitable to allow those of skill in the art to determine how to implement the embodiments previously described with an appropriate combination of hardware and software, with appropriate modification to the illustrated embodiment to the particular device, machine, etc. used.

While only a single machine is illustrated, the term "machine" shall also be taken to include any collection of machines that individually or jointly execute a set (or multiple sets) of instructions to perform any one or more of the methodologies discussed herein.

The example of the machine 500 includes at least one processor 502 (e.g., controller, microcontroller, a central processing unit (CPU), a graphics processing unit (GPU), tensor processing unit (TPU), advanced processing unit (APU), or combinations thereof), one or more memories such as a main memory 504 a static memory 506, or other types of memory, which communicate with each other via link 508. Link 508 may be a bus or other type of connection channel. The machine 500 may include further optional aspects such as a graphics display unit 510 comprising any type of display. The machine 500 may also include other optional aspects such as an alphanumeric input device 512 (e.g., a keyboard, touch screen, and so forth), a user interface (UI) navigation device 514 (e.g., a mouse, trackball, touch device, and so forth), a storage unit 516 (e.g., disk drive or other storage device(s)), a signal generation device 518 (e.g., a speaker), sensor(s) 521 (e.g., global positioning sensor, accelerometer(s), microphone(s), camera(s), and so forth), output controller 528 (e.g., wired or wireless connection to connect and/or communicate with one or more other devices such as a universal serial bus (USB), near field communication (NFC), infrared (IR), serial/parallel bus, etc.), and a network interface device 520 (e.g., wired and/or wireless) to connect to and/or communicate over one or more networks 526.

The various memories (i.e., 504, 506, and/or memory of the processor(s) 502) and/or storage unit 516 may store one or more sets of instructions and data structures (e.g., software) 524 embodying or utilized by any one or more of the methodologies or functions described herein. These instructions, when executed by processor(s) 502 cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include storage devices such as solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media specifically and unequivocally excludes carrier waves, modulated data signals, and other such transitory media, at least some of which are covered under the term "signal medium" discussed below.

The terms "machine-readable medium," "computer-readable medium" and "device-readable medium" mean the same thing and may be used interchangeably in this disclosure. The terms are defined to include both machine-storage media and signal media. Thus, the terms include both storage devices/media and carrier waves/modulated data signals.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

While all of the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the general inventive concept.

Figure 6:
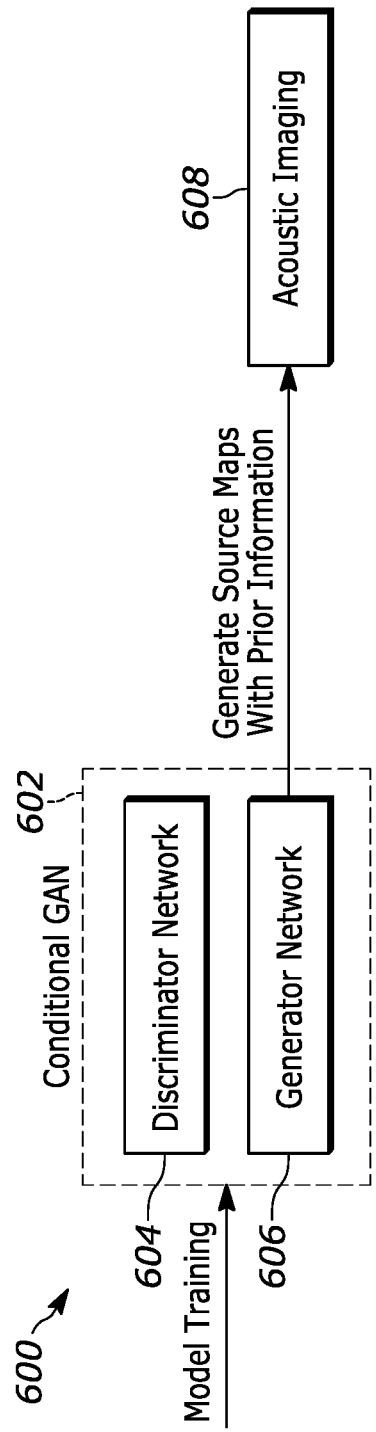
FIG. 6 is a block diagram of acoustic imaging system architecture.

FIG. 6 is a block diagram of acoustic imaging system architecture 600 using a Conditional Generative Adversarial Network (cGAN) 602 of a discriminator network 604 and a generator network 606 to produce a synthetic apertured acoustic image 608.

Figure 7:
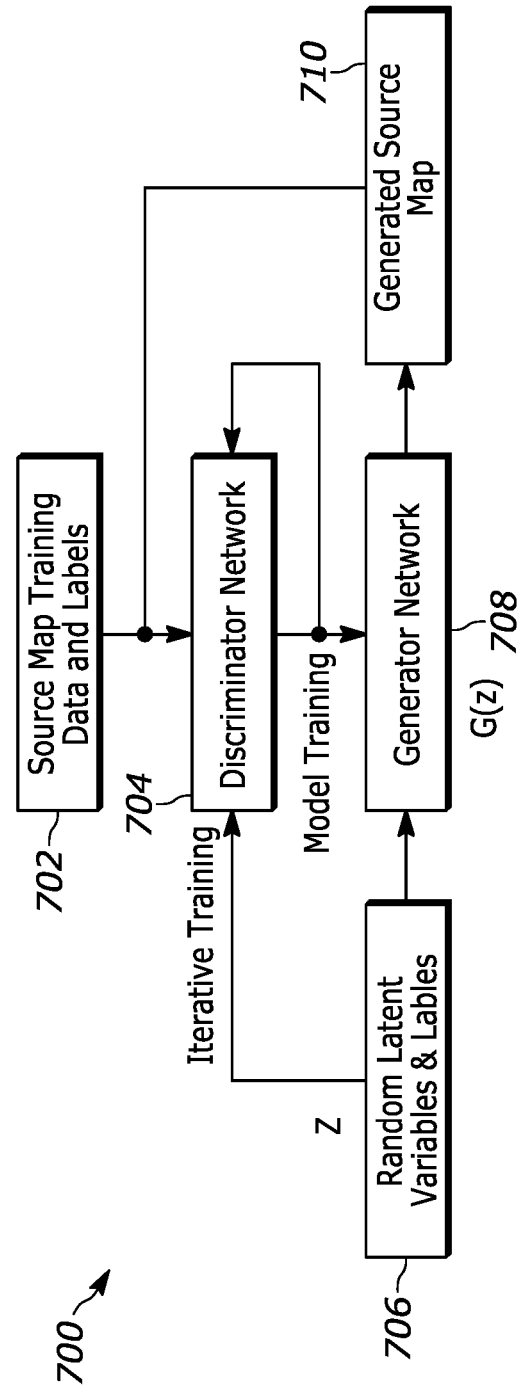
FIG. 7 is a flow diagram of training conditional GAN of an acoustic imaging system.

FIG. 7 is a flow diagram of training conditional GAN of an acoustic imaging system 700. In the block 702, source map training data and labels are received by a controller. In block 704, the controller processes the source map training data and labels via a discriminator network. In block 706, the controller produces random latent variables and labels. In block 708, the controller produces an acoustic image source map via a generator network that the controller outputs in block 710. This output is then fed back to the discriminator network block 704 along with source map training data and labels 702, and the output of the discriminator network to train the network. Restated for clarity, the training is iterative. In each iteration, the discriminator takes 702, labels in 706, 710 and its own output in the last iteration as input. Next, its output in the current iteration, as well as 706, will be fed into the generator network 708, to update 710. Then the next iteration starts. A controller generates 706 randomly in each training iteration, but 706 does not depend on the output of the discriminator network.

Figure 8:
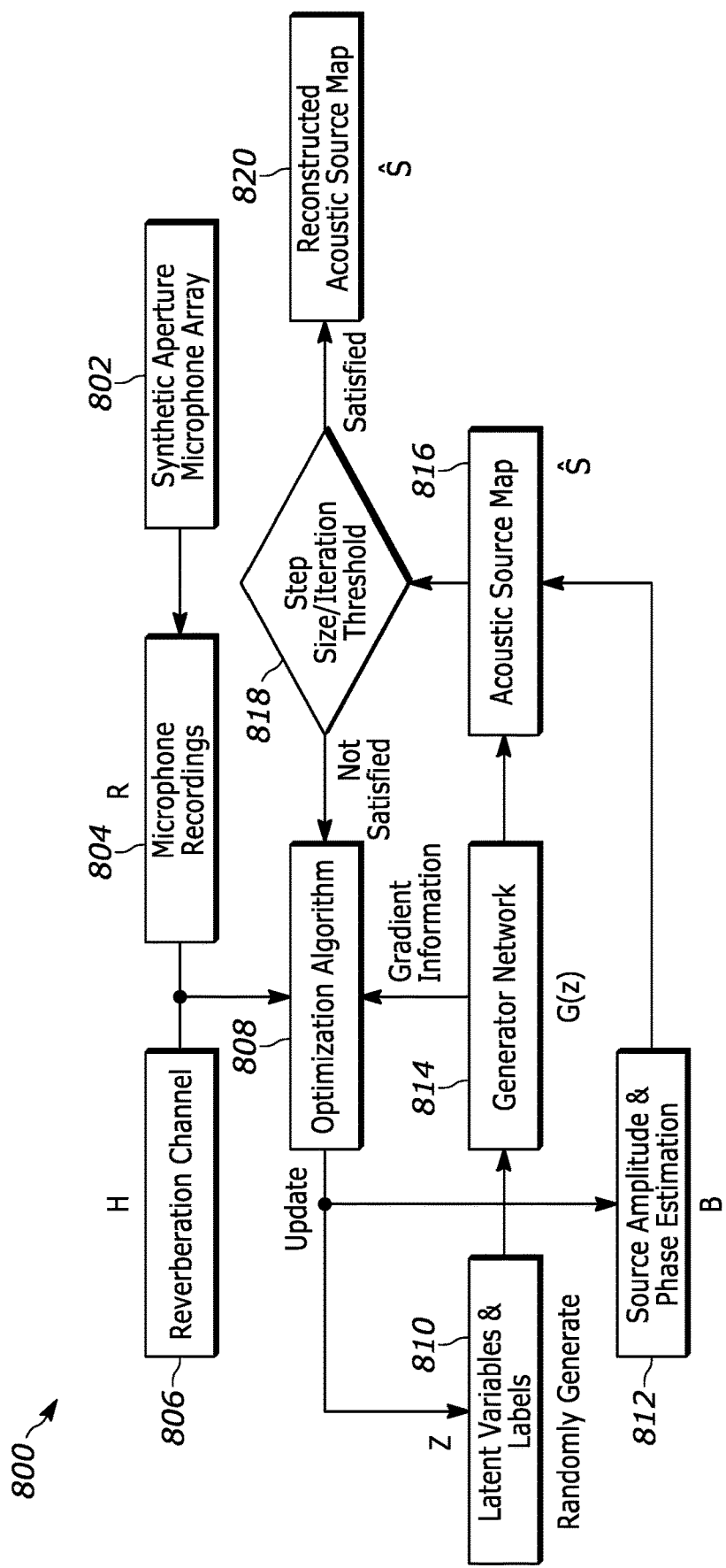
FIG. 8 is a flow diagram of acoustic imaging in an acoustic imaging system.

FIG. 8 is a flow diagram of acoustic imaging in an acoustic imaging system 800. In the block 802, a microphone array receives an input and outputs a signal that is used to produce microphone recordings in block 804. The microphone recordings from block 804 and reverberation channel data 806 are input to block 808 in which a controller performs an optimization algorithm. The reverberation channel data 806 may include a model of the room, area, or scene, and may be generated by another type of sensor such as a LiDAR sensor, an infrared sensor, a Radar sensor, or an ultrasonic sensor to create a data generative model. The output of the optimization algorithm 808 is used to generate latent variables and labels in block 810 and source amplitude and phase estimation data in block 812. The optimization algorithm 808 may be represented by equation 7 which is to be minimized. A generator network 814 provides feedback to the optimizer algorithm 808 and produces an acoustic source map 816. The generator network 814 may be represented by equation 6. Restated for clarity, equation 6 is what occurs in the generator network 814 that is passed by the arrow between 814 and 816. The feedback of the acoustic source map 816 may be a fixed number of iterations, a variable number of iterations, or it may be based on convergence of the acoustic source maps such that the difference is below a threshold such as a number or percentage of pixels. If the iterations are acceptable, a reconstructed acoustic source map 820 is output.

Figure 9:
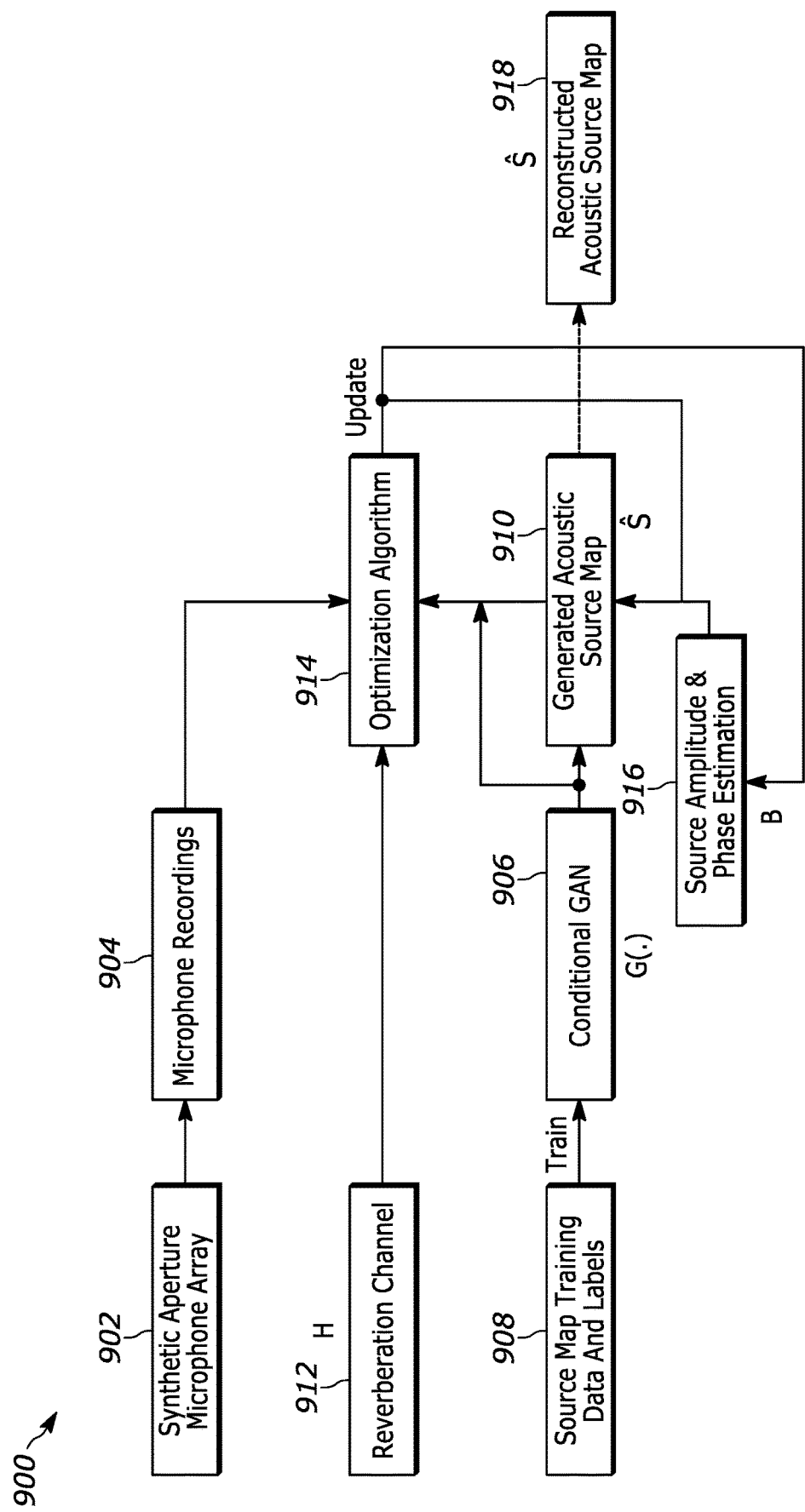
FIG. 9 is a flow diagram of an acoustic imaging system.

FIG. 9 is a flow diagram of acoustic imaging in an acoustic imaging system 900. In the block 902, a microphone array receives an input and outputs a signal that is used to produce microphone recordings in block 904. In block 906, a controller source map training data and labels 908. In block 910, the controller generates an acoustic source map via the cGAN 906, source amplitude & phase estimation from block 916, and feedback from an optimizer algorithm 914. The controller then optimizes microphone recordings 904, cGAN output 906, the generated acoustic source map 910 and reverberation channel 912 data in the optimizer block 914. The reverberation channel data 912 may include a model of the room, area, or scene, and may be generated by another type of sensor such as a LiDAR sensor, an infrared sensor, a Radar sensor, or an ultrasonic sensor to create a data generative model. The output of the optimization algorithm 914 is used to generate latent variables and labels in block 810 and source amplitude and phase estimation data in block 916. The optimization algorithm 914 may be represented by equation 7 which is to be minimized. A generator network 814 provides feedback to the optimizer algorithm 808 and produces an acoustic source map 916. The cGAN block 906 may be represented by equation 6, or in other words equation 6 is what happens on the arrow between 906 and 910. The feedback of the acoustic source map 910 may be a fixed number of iterations, a variable number of iterations, or it may be based on convergence of the acoustic source maps such that the difference is below a threshold such as a number or percentage of pixels. If the iterations are acceptable, a reconstructed acoustic source map 918 is output.

Figure 10A:
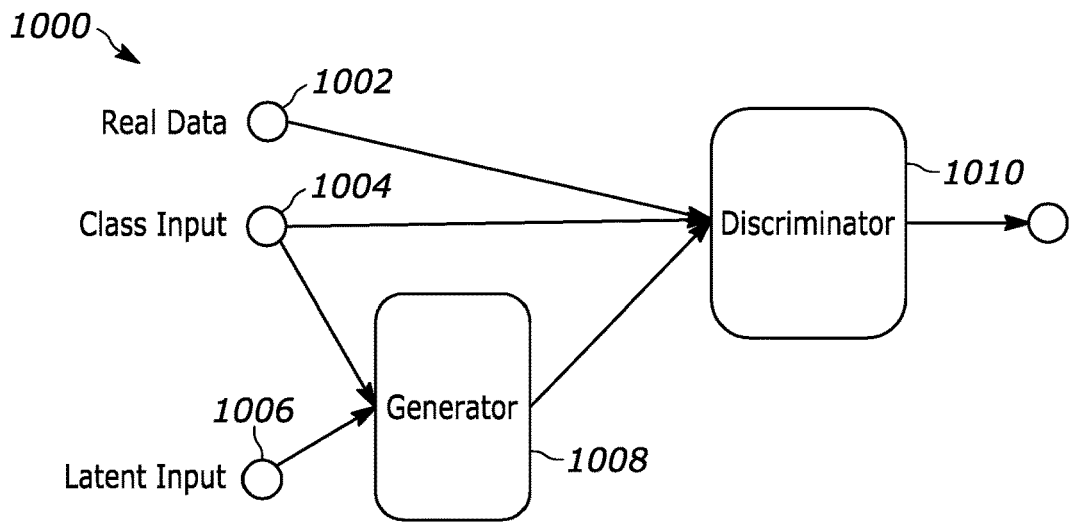
FIG. 10A is a block diagram of an acoustic imaging system having a discriminator and a generator.

FIG. 10A is a block diagram of acoustic imaging system 1000 using a Conditional Generative Adversarial Network (cGAN) that receives real data 1002, class input 1004, and latent data 1006 and processes via a generator network 1008 and a discriminator network 1010 to produce an acoustic image.

Figure 10B:
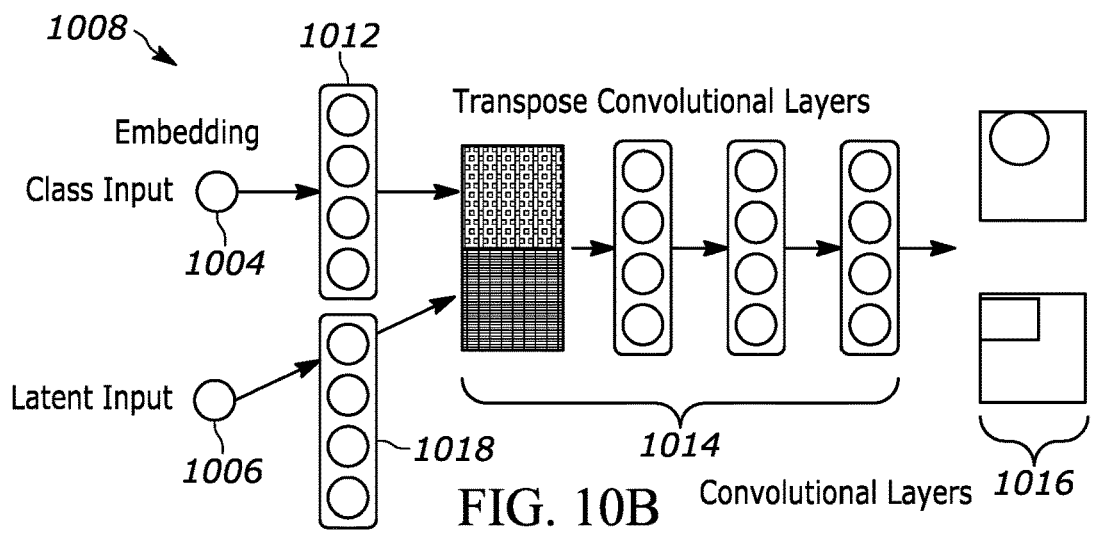
FIG. 10B is a block diagram of the generator of the acoustic imaging system of FIG. 10A.

FIG. 10B is a block diagram of the generator network 1008 of the acoustic imaging system of FIG. 10A. 1012 is the seed and 1014 is the convolution layers

1012 is a fully-connected layer and 1018 is a fully-connected layer that go to 1014 which consists of two transpose convolutional layers and one convolutional layer at the end.

Figure 10C:
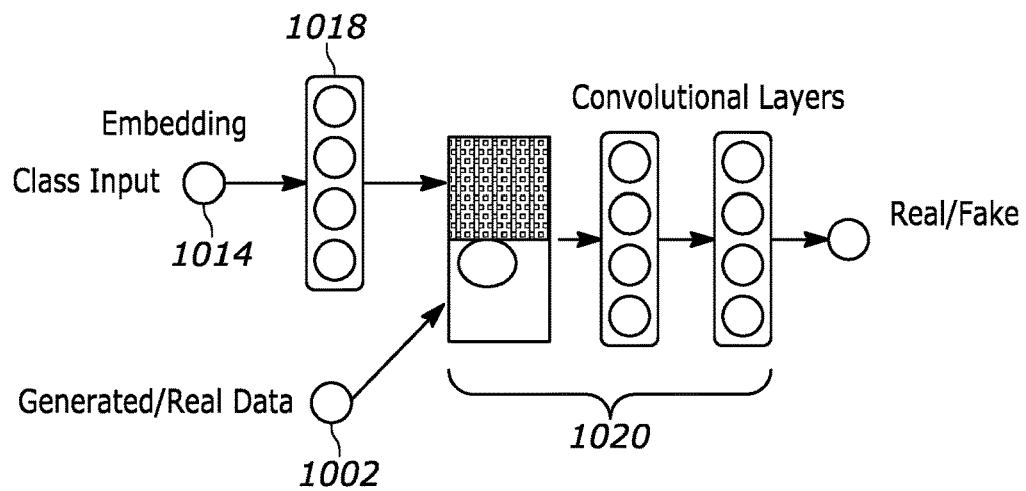
FIG. 10C is a block diagram of the discriminator of the acoustic imaging system of FIG. 10A.

FIG. 10C is a block diagram of the discriminator of the acoustic imaging system of FIG. 10A. 1018 is a fully-connected layer, while 1020 consists of two convolutional layers. In addition, 1002 in FIG. 10C is not equivalent to 1002 in FIG. 10A, since it includes both 1002 in FIG. 10A and the output of 1008 in FIG. 10A.

Figure 11:
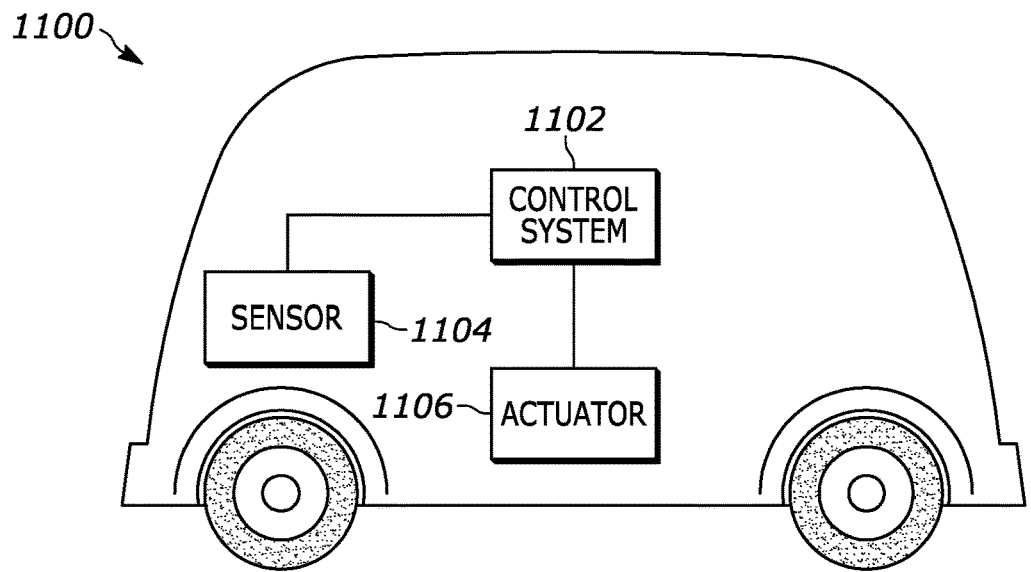
FIG. 11 is a schematic diagram of a control system configured to control a vehicle.

FIG. 11 is a schematic diagram of control system 1102 configured to control a vehicle, which may be an at least partially autonomous vehicle or an at least partially autonomous robot. The vehicle includes a sensor 1104 and an actuator 1106. The sensor 1104 may include one or more wave energy based sensor (e.g., a Charge Coupled Device CCD, or video), radar, LiDAR, microphone array, ultrasonic, infrared, thermal imaging, acoustic imaging or other technologies (e.g., positioning sensors such as GPS). One or more of the one or more specific sensors may be integrated into the vehicle. Alternatively or in addition to one or more specific sensors identified above, the control module 1102 may include a software module configured to, upon execution, determine a state of actuator 1104.

In embodiments in which the vehicle is an at least a partially autonomous vehicle, actuator 1106 may be embodied in a brake system, a propulsion system, an engine, a drivetrain, or a steering system of the vehicle. Actuator control commands may be determined such that actuator 1106 is controlled such that the vehicle avoids collisions with detected objects. Detected objects may also be classified according to what the classifier deems them most likely to be, such as pedestrians or trees. The actuator control commands may be determined depending on the classification. For example, control system 1102 may segment an image (e.g., optical, acoustic, thermal) or other input from sensor 1104 into one or more background classes and one or more object classes (e.g. pedestrians, bicycles, vehicles, trees, traffic signs, traffic lights, road debris, or construction barrels/cones, etc.), and send control commands to actuator 1106, in this case embodied in a brake system or propulsion system, to avoid collision with objects. In another example, control system 1102 may segment an image into one or more background classes and one or more marker classes (e.g., lane markings, guard rails, edge of a roadway, vehicle tracks, etc.), and send control commands to actuator 1106, here embodied in a steering system, to cause the vehicle to avoid crossing markers and remain in a lane. In a scenario where an adversarial attack may occur, the system described above may be further trained to better detect objects or identify a change in lighting conditions or an angle for a sensor or camera on the vehicle.

In other embodiments where vehicle 1100 is an at least partially autonomous robot, vehicle 1100 may be a mobile robot that is configured to carry out one or more functions, such as flying, swimming, diving and stepping. The mobile robot may be an at least partially autonomous lawn mower or an at least partially autonomous cleaning robot. In such embodiments, the actuator control command 1106 may be determined such that a propulsion unit, steering unit and/or brake unit of the mobile robot may be controlled such that the mobile robot may avoid collisions with identified objects.

In another embodiment, vehicle 1100 is an at least partially autonomous robot in the form of a gardening robot. In such embodiment, vehicle 1100 may use an optical sensor as sensor 1104 to determine a state of plants in an environment proximate vehicle 1100. Actuator 1106 may be a nozzle configured to spray chemicals. Depending on an identified species and/or an identified state of the plants, actuator control command 1102 may be determined to cause actuator 1106 to spray the plants with a suitable quantity of suitable chemicals.

Vehicle 1100 may be an at least partially autonomous robot in the form of a domestic appliance. Non-limiting examples of domestic appliances include a washing machine, a stove, an oven, a microwave, or a dishwasher. In such a vehicle 1100, sensor 1104 may be an optical or acoustic sensor configured to detect a state of an object which is to undergo processing by the household appliance. For example, in the case of the domestic appliance being a washing machine, sensor 1104 may detect a state of the laundry inside the washing machine. Actuator control command may be determined based on the detected state of the laundry.

In this embodiment, the control system 1102 would receive image (optical or acoustic) and annotation information from sensor 1104. Using these and a prescribed number of classes k and similarity measure $\overline{K}$ that are stored in the system, the control system 1102 may use the method described in FIG. 10 to classify each pixel of the image received from sensor 1104. Based on this classification, signals may be sent to actuator 1106, for example, to brake or turn to avoid collisions with pedestrians or trees, to steer to remain between detected lane markings, or any of the actions performed by the actuator 1106 as described above. Signals may also be sent to sensor 1104 based on this classification, for example, to focus or move a camera lens.

Figure 12:
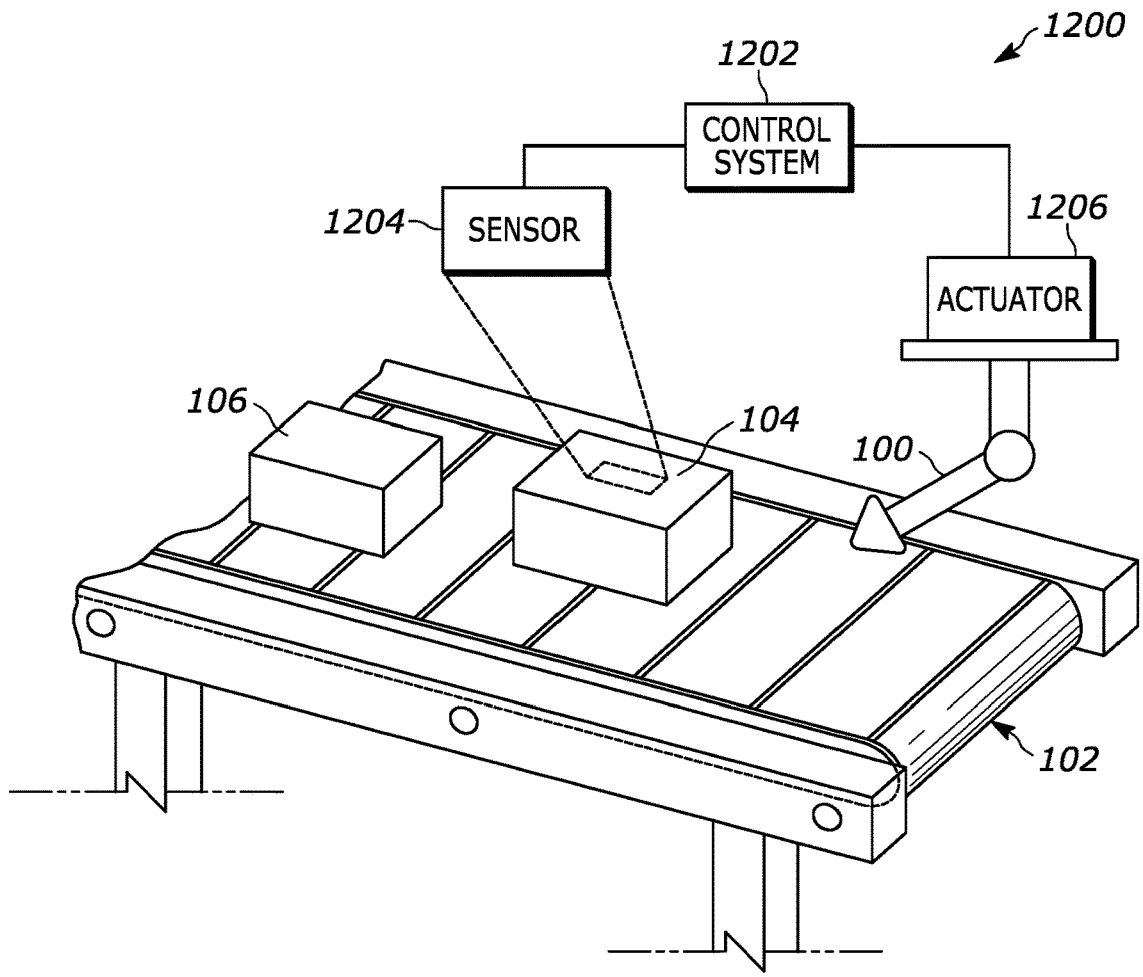
FIG. 12 is a schematic diagram of a control system configured to control a manufacturing machine.

FIG. 12 depicts a schematic diagram of control system 1202 configured to control system 1200 (e.g., manufacturing machine), such as a punch cutter, a cutter or a gun drill, of manufacturing system 102, such as part of a production line. Control system 1202 may be configured to control actuator 14, which is configured to control system 100 (e.g., manufacturing machine).

Sensor 1204 of system 1200 (e.g., manufacturing machine) may be an wave energy sensor such as an optical or acoustic sensor or sensor array configured to capture one or more properties of a manufactured product. Control system 1202 may be configured to determine a state of a manufactured product from one or more of the captured properties. Actuator 1206 may be configured to control system 1202 (e.g., manufacturing machine) depending on the determined state of manufactured product 104 for a subsequent manufacturing step of the manufactured product. The actuator 1206 may be configured to control functions of FIG. 11 (e.g., manufacturing machine) on subsequent manufactured products of the system (e.g., manufacturing machine) depending on the determined state of the previous manufactured product.

In this embodiment, the control system 1202 would receive image (e.g., optical or acoustic) and annotation information from sensor 1204. Using these and a prescribed number of classes k and similarity measure $\overline{K}$ that are stored in the system, the control system 1202 may use the method described in FIG. 10 to classify each pixel of the image received from sensor 1204, for example, to segment an image of a manufactured object into two or more classes, to detect anomalies in the manufactured product, to ensure the presence of objects on the manufactured product such as barcodes. Based on this classification, signals may be sent to actuator 1206. For example, if control system 1202 detects anomalies in a product, actuator 1206 may mark or remove anomalous or defective products from the line. In another example, if control system 1202 detects the presence of barcodes or other objects to be placed on the product, actuator 1106 may apply these objects or remove them. Signals may also be sent to sensor 1204 based on this classification, for example, to focus or move a camera lens.

Figure 13:
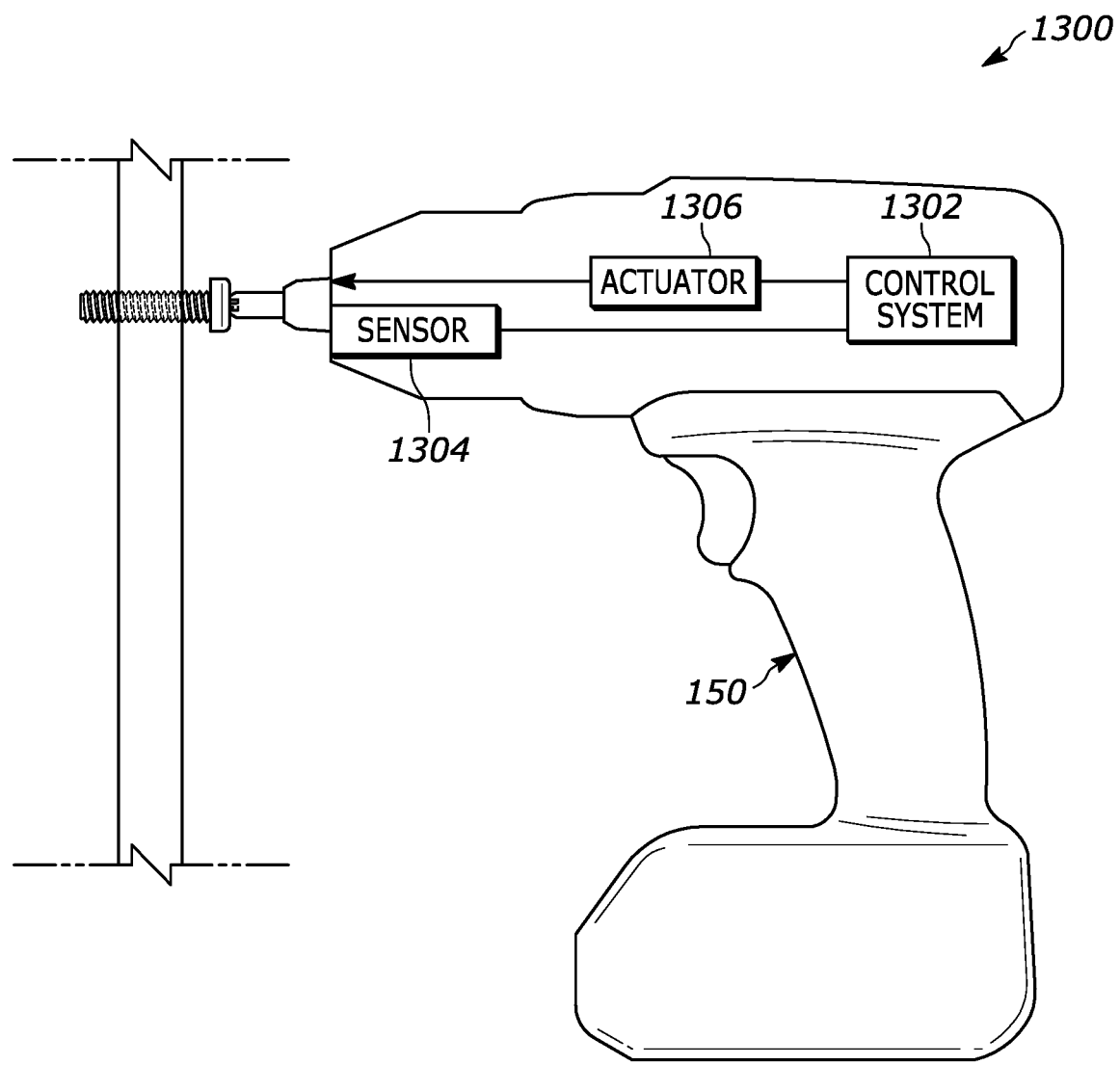
FIG. 13 is a schematic diagram of a control system configured to control a power tool.

FIG. 13 depicts a schematic diagram of control system 1302 configured to control power tool 1300, such as a power drill or driver, that has an at least partially autonomous mode. Control system 1302 may be configured to control actuator 1306, which is configured to control power tool 1300.

Sensor 1304 of power tool 1300 may be a wave energy sensor such as an optical or acoustic sensor configured to capture one or more properties of a work surface and/or fastener being driven into the work surface. Control system 1302 may be configured to determine a state of work surface and/or fastener relative to the work surface from one or more of the captured properties.

In this embodiment, the control system 1302 would receive image (e.g., optical or acoustic) and annotation information from sensor 1304. Using these and a prescribed number of classes k and similarity measure $\overline{K}$ that are stored in the system, the control system 1302 may use the method described in FIG. 10 to classify each pixel of the image received from sensor 1304 in order to segment an image of a work surface or fastener into two or more classes or to detect anomalies in the work surface or fastener. Based on this classification, signals may be sent to actuator 1306, for example to the pressure or speed of the tool, or any of the actions performed by the actuator 1306 as described in the above sections. Signals may also be sent to sensor 1304 based on this classification, for example, to focus or move a camera lens. In another example, the image may be a time series image of signals from the power tool 1300 such as pressure, torque, revolutions per minute, temperature, current, etc. in which the power tool is a hammer drill, drill, hammer (rotary or demolition), impact driver, reciprocating saw, oscillating multi-tool, and the power tool is either cordless or corded.

Figure 14:
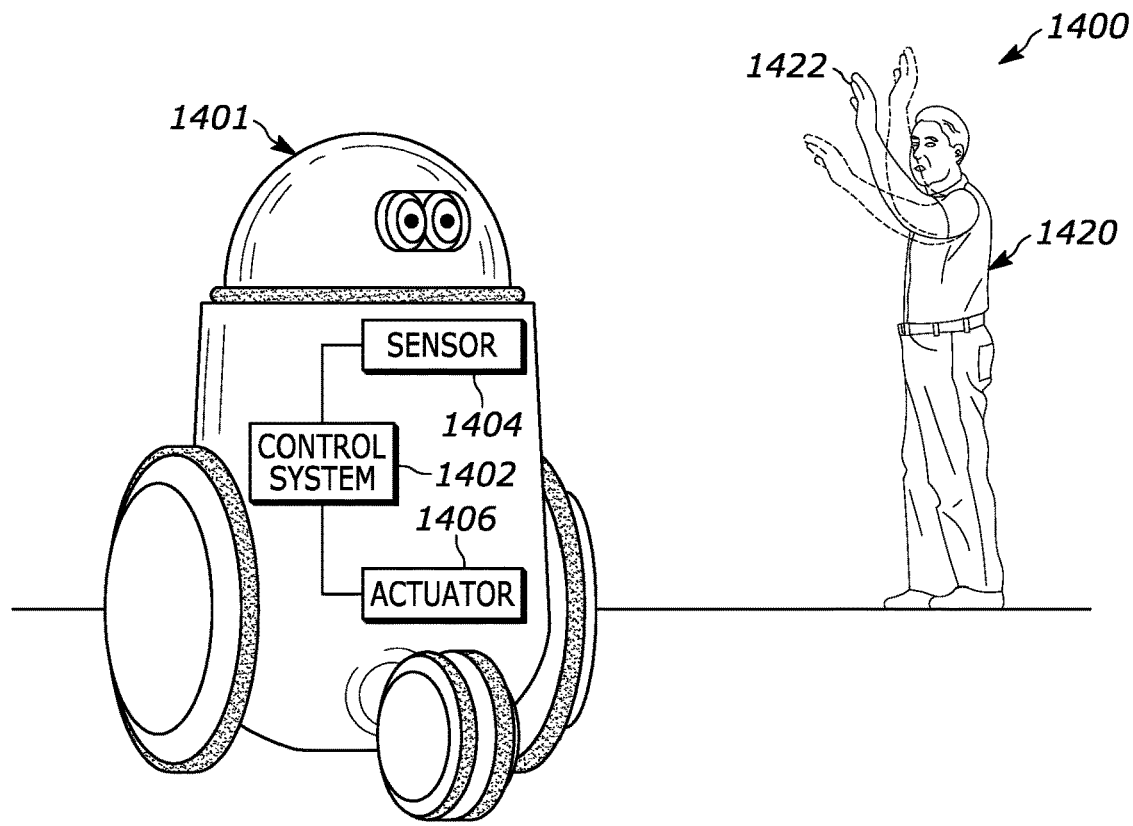
FIG. 14 is a schematic diagram of a control system configured to control an automated personal assistant.

FIG. 14 depicts a schematic diagram of control system 1402 configured to control automated personal assistant 1401. Control system 1402 may be configured to control actuator 1406, which is configured to control automated personal assistant 1401. Automated personal assistant 1401 may be configured to control a domestic appliance, such as a washing machine, a stove, an oven, a microwave or a dishwasher.

In this embodiment, the control system 1402 would receive image (e.g., optical or acoustic) and annotation information from sensor 1404. Using these and a prescribed number of classes k and similarity measure $\overline{K}$ that are stored in the system, the control system 1402 may use the method described in FIG. 10 to classify each pixel of the image received from sensor 1404, for example, to segment an image of an appliance or other object to manipulate or operate. Based on this classification, signals may be sent to actuator 1406, for example, to control moving parts of automated personal assistant 1401 to interact with domestic appliances, or any of the actions performed by the actuator 1406 as described in the above sections. Signals may also be sent to sensor 1404 based on this classification, for example, to focus or move a camera lens.

Figure 15:
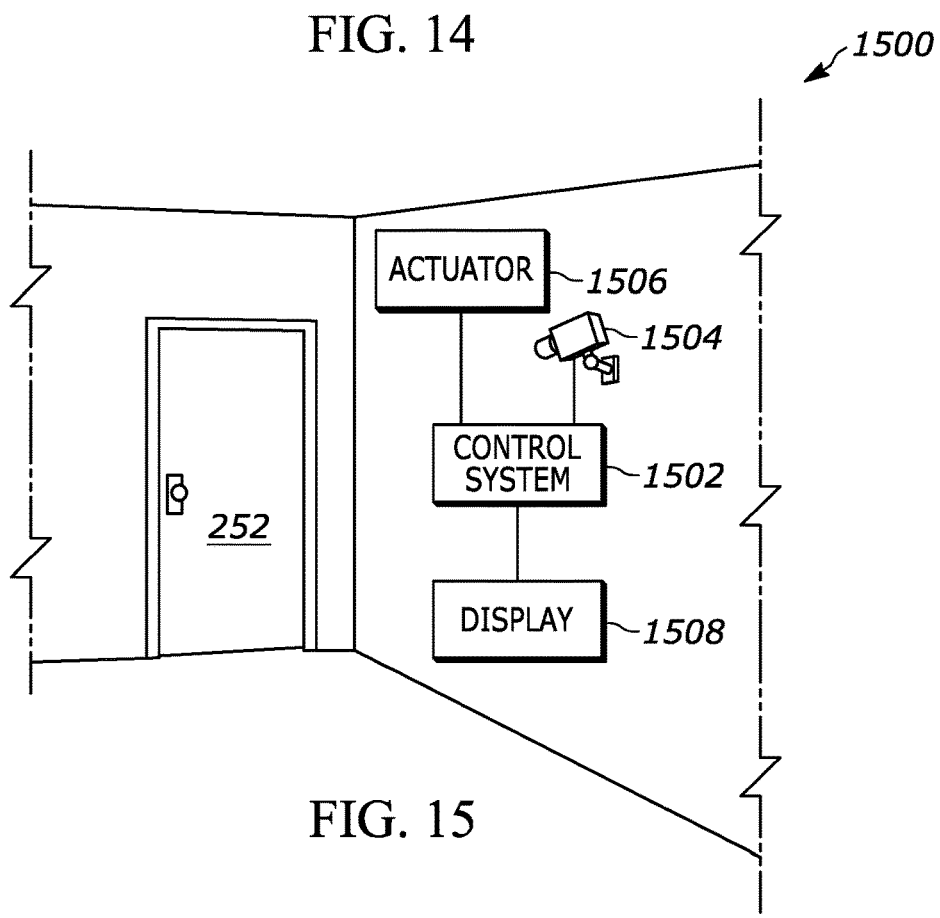
FIG. 15 is a schematic diagram of a control system configured to control a monitoring system.

FIG. 15 depicts a schematic diagram of control system 1502 configured to control monitoring system 1500. Monitoring system 1500 may be configured to physically control access through door 252. Sensor 1504 may be configured to detect a scene that is relevant in deciding whether access is granted. Sensor 1504 may be an optical or acoustic sensor or sensor array configured to generate and transmit image and/or video data. Such data may be used by control system 1502 to detect a person's face.

Monitoring system 1500 may also be a surveillance system. In such an embodiment, sensor 1504 may be a wave energy sensor such as an optical sensor, infrared sensor, acoustic sensor configured to detect a scene that is under surveillance and control system 1502 is configured to control display 1508. Control system 1502 is configured to determine a classification of a scene, e.g. whether the scene detected by sensor 1504 is suspicious. A perturbation object may be utilized for detecting certain types of objects to allow the system to identify such objects in non-optimal conditions (e.g., night, fog, rainy, interfering background noise etc.). Control system 1502 is configured to transmit an actuator control command to display 1508 in response to the classification. Display 1508 may be configured to adjust the displayed content in response to the actuator control command. For instance, display 1508 may highlight an object that is deemed suspicious by controller 1502.

In this embodiment, the control system 1502 would receive image (optical or acoustic) and annotation information from sensor 1504. Using these and a prescribed number of classes k and similarity measure $\overline{K}$ that are stored in the system, the control system 1502 may use the method described in FIG. 10 to classify each pixel of the image received from sensor 1504 in order to, for example, detect the presence of suspicious or undesirable objects in the scene, to detect types of lighting or viewing conditions, or to detect movement. Based on this classification, signals may be sent to actuator 1506, for example, to lock or unlock doors or other entryways, to activate an alarm or other signal, or any of the actions performed by the actuator 1506 as described in the above sections. Signals may also be sent to sensor 1504 based on this classification, for example, to focus or move a camera lens.

Figure 16:
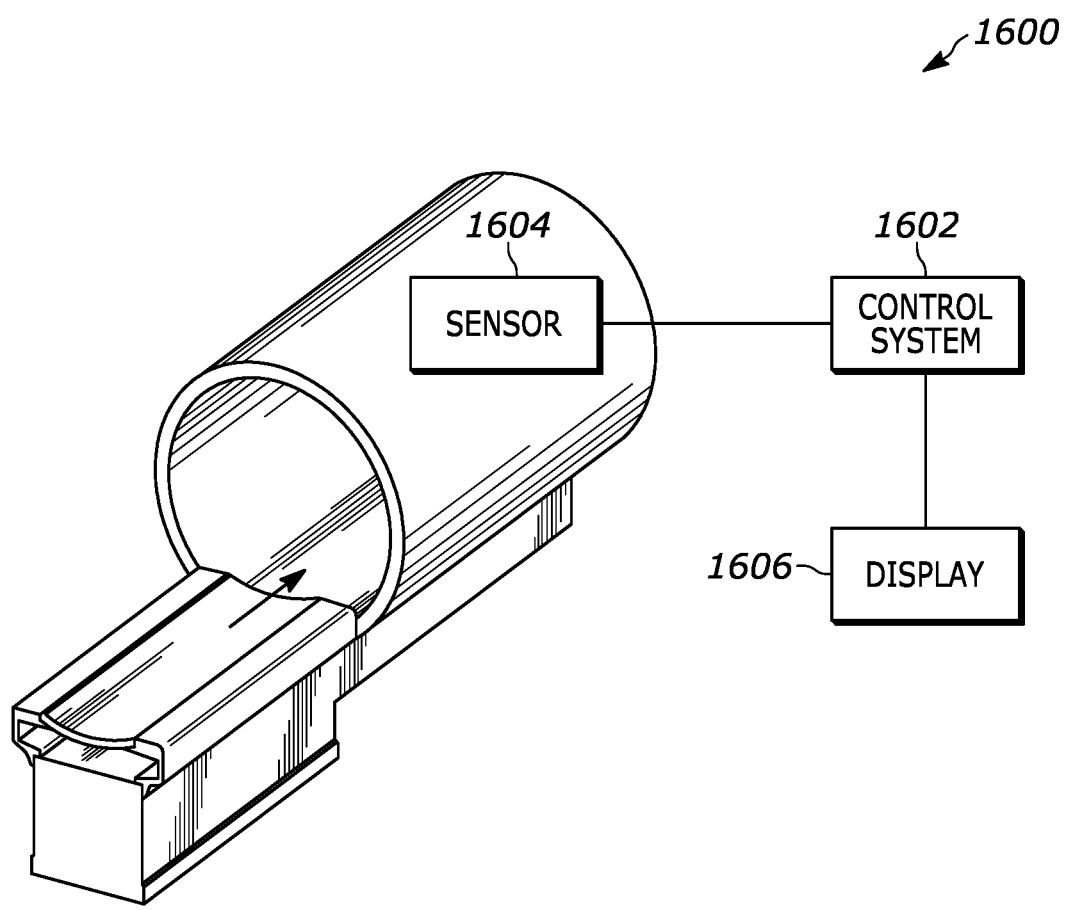
FIG. 16 is a schematic diagram of a control system configured to control a medical imaging system.

FIG. 16 depicts a schematic diagram of control system 1602 configured to control imaging system 1600, for example an MIII apparatus, x-ray imaging apparatus or ultrasonic apparatus. Sensor 1604 may, for example, be an imaging sensor or acoustic sensor array. Control system 1602 may be configured to determine a classification of all or part of the sensed image. Control system 1602 may be configured to determine or select an actuator control command in response to the classification obtained by the trained neural network. For example, control system 1602 may interpret a region of a sensed image (optical or acoustic) to be potentially anomalous. In this case, the actuator control command may be determined or selected to cause display 1606 to display the imaging and highlighting the potentially anomalous region.

In this embodiment, the control system 1602 would receive image and annotation information from sensor 1604. Using these and a prescribed number of classes k and similarity measure $\overline{K}$ that are stored in the system, the control system 1602 may use the method described in FIG. 10 to classify each pixel of the image received from sensor 1604. Based on this classification, signals may be sent to actuator 1606, for example, to detect anomalous regions of the image or any of the actions performed by the actuator 1606 as described in the above sections.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

While all of this disclosure has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. This disclosure in its broader aspects is therefore not limited to the specific details, representative apparatus and method, and illustrative examples shown and described. Accordingly, departures may be made from such details without departing from the spirit or scope of the general inventive concept.

What is claimed is:

1. A method of acoustic imaging an area comprising:
training a conditional generative adversarial network (cGAN) based on spatial-temporal data of an area to obtain a trained cGAN;
receiving a signal from a microphone and reverberation channel data from within the area;
generating, via the trained cGAN, an acoustic image;
updating the trained cGAN based on an optimization of the signal and reverberation channel data to obtain an updated, trained cGAN;
generating, via the updated trained cGAN, an acoustic source map;
optimizing the acoustic source map to obtain an optimized acoustic source map; and
outputting the optimized acoustic source map.

2. The method of claim 1 further comprising:
receiving a location signal associated with the microphone and reverberation channel data, and wherein the updating the trained cGAN is further based on the location signal associated with the microphone and reverberation channel.

3. The method of claim 1 wherein optimizing the acoustic source map is convergence of the acoustic source map and a previous-in-time acoustic source map.

4. The method of claim 1, wherein the reverberation channel data is received from a sensor different than the microphone.

5. The method of claim 1, wherein the acoustic source map is approximated by $$S(\omega_0) \approx \hat{S}_{\omega_0}\left(B_k^{(l)}, z_k^{(l)}\right) = \sum_{l=0}^{1}\sum_{k=1}^{K} B_k^{(l)} G\left(z_k^{(l)}, l\right)$$

in which K denotes a number of geometric shape components needed to represent all sources, $B_k^{(l)}$ is a relative amplitude for each shape component k, $z_k^{(l)}$ is a vector that denotes latent input for the generator to produce shape component k of type l, and output of $G(z_k^{(l)}, l)$ is reshaped as a vector to match the dimension of $S(\omega_0)$.

6. The method of claim 1, wherein optimizing the acoustic source map is when $$\left\|H(\omega_0)\hat{S}_{\omega_0}\left(B_k^{(l)}, z_k^{(l)}\right) - R(\omega_0)\right\|_2^2 + \lambda \sum_{l=0}^{1}\sum_{k=1}^{K} \left\|z_k^{(l)}\right\|$$

converges to below a threshold.

7. The method of claim 1, wherein the microphone is a movable microphone.

8. The method of claim 1, wherein the microphone is a microphone array.

9. A system comprising:
one or more processors; and
one or more memories communicatively connected to the one or more processors, wherein the one or more memories include executable instructions that when executed by the one or more processors cause the system to perform operations including:
training a conditional generative adversarial network (cGAN) based on spatial-temporal data of an area to obtain a trained cGAN;
receiving a signal from a microphone and reverberation channel data from within the area;
generating, via the trained cGAN, an acoustic image;
updating the trained cGAN based on an optimization of the signal and reverberation channel data to obtain an updated, trained cGAN;
generating, via the updated trained cGAN, an acoustic source map;
optimizing the acoustic source map to obtain an optimized acoustic source map; and
outputting the optimized acoustic source map.

10. The system of claim 9, wherein the microphone is a movable microphone.

11. The system of claim 9, wherein the microphone is a microphone array.

12. The system of claim 9, wherein the operations further include:
receiving a location signal associated with the microphone and reverberation channel data, and wherein the updating the trained cGAN is further based on the location signal associated with the microphone and reverberation channel.

13. The system of claim 9, wherein optimizing the acoustic source map is convergence of the acoustic source map and a previous-in-time acoustic source map.

14. The system of claim 9, wherein the reverberation channel data is received from a sensor different than the microphone.

15. The system of claim 9, wherein the acoustic source map is approximated by $$S(\omega_0) \approx \hat{S}_{\omega_0}\left(B_k^{(l)}, z_k^{(l)}\right) = \sum_{l=0}^{1}\sum_{k=1}^{K} B_k^{(l)} G\left(z_k^{(l)}, l\right)$$

in which K denotes a number of geometric shape components needed to represent all sources, $B_k^{(l)}$ is a relative amplitude for each shape component k, $z_k^{(l)}$ is a vector that denotes latent input for the generator to produce shape component k of type l, and output of $G(z_k^{(l)}, l)$ is reshaped as a vector to match the dimension of $S(\omega_0)$.

16. The system of claim 9, wherein optimizing the acoustic source map is when $$\left\|H(\omega_0)\hat{S}_{\omega_0}\left(B_k^{(l)}, z_k^{(l)}\right) - R(\omega_0)\right\|_2^2 + \lambda \sum_{l=0}^{1}\sum_{k=1}^{K} \left\|z_k^{(l)}\right\|_2^2$$

converges to below a threshold.

17. A system comprising:
a wave energy based sensor;
one or more processors; and
one or more memories communicatively connected to the one or more processors, wherein the one or more memories include executable instructions that when executed by the one or more processors cause the system to perform operations including:
receiving a signal from the wave energy based sensor and reverberation channel data;

generating a wave energy source map via a trained cGAN, wherein the cGAN is trained based on spatial-temporal data;

optimizing the wave energy source map to obtain an optimized wave energy source map; and outputting the optimized wave energy source map.

18. The system of claim 17, wherein the system is a vehicle.

19. The system of claim 17, wherein the system is an at least partially autonomous robot.

20. The system of claim 17, wherein the system is a monitoring system that controls access to a door.

* * * * *

UNITED STATES PATENT AND TRADEMARK OFFICE
CERTIFICATE OF CORRECTION

PATENT NO. : 11,867,806 B2  
APPLICATION NO. : 17/339805  
DATED : January 9, 2024  
INVENTOR(S) : Boqiang Fan et al.

Page 1 of 1

It is certified that error appears in the above-identified patent and that said Letters Patent is hereby corrected as shown below:

In the Claims

Column 19, Lines 48-50; Claim 6:
After "wherein optimizing the acoustic source map is when"

Delete " $\left\| H(\omega_0)\hat{S}_{\omega_0}(B_k^{(l)}, z_k^{(l)}) - R(\omega_0) \right\|_2^2 + \lambda \sum_{l=0}^{1} \sum_{k=1}^{K} \left\| z_k^{(l)} \right\| $ ,"

And insert -- $\left\| H(\omega_0)\hat{S}_{\omega_0}(B_k^{(l)}, z_k^{(l)}) - R(\omega_0) \right\|_2^2 + \lambda \sum_{l=0}^{1} \sum_{k=1}^{K} \left\| z_k^{(l)} \right\|_2^2$ --

Signed and Sealed this  
Third Day of September, 2024

*Katherine Kelly Vidal*  
Katherine Kelly Vidal  
*Director of the United States Patent and Trademark Office*